United States Patent
Walsh

(10) Patent No.: US 11,182,734 B2
(45) Date of Patent: Nov. 23, 2021

(54) INTELLIGENT DELIVERY SYSTEM

(71) Applicant: Dale Walsh, Dallas, GA (US)

(72) Inventor: Dale Walsh, Dallas, GA (US)

(73) Assignee: RICOH COMPANY, LTD., Tokyo (JP)

(*) Notice: Subject to any disclaimer, the term of this patent is extended or adjusted under 35 U.S.C. 154(b) by 895 days.

(21) Appl. No.: 15/280,277

(22) Filed: Sep. 29, 2016

(65) Prior Publication Data

US 2018/0089623 A1 Mar. 29, 2018

(51) Int. Cl.
*G06Q 10/08* (2012.01)
*G06K 9/00* (2006.01)

(52) U.S. Cl.
CPC ..... *G06Q 10/0838* (2013.01); *G06K 9/00463* (2013.01); *G06K 9/00469* (2013.01)

(58) Field of Classification Search
CPC ........... G06Q 10/0838; G06K 9/00469; G06K 9/00463
See application file for complete search history.

(56) References Cited

U.S. PATENT DOCUMENTS

| | | | | |
|---|---|---|---|---|
| 2004/0117326 A1* | 6/2004 | Amato | ............... | G06Q 10/0837 705/401 |
| 2004/0139033 A1* | 7/2004 | Amato | ............... | G06Q 10/083 705/400 |
| 2004/0178128 A1* | 9/2004 | O'Connell | ............... | B07C 3/00 209/584 |
| 2006/0253405 A1* | 11/2006 | Nirenberg | ............... | G06Q 50/32 705/401 |
| 2007/0226088 A1 | 9/2007 | Miles et al. | | |
| 2008/0040133 A1* | 2/2008 | Foth | ............... | G06Q 10/08355 705/338 |
| 2008/0103791 A1 | 5/2008 | Heiden et al. | | |
| 2008/0104179 A1* | 5/2008 | Agrawal | ............... | G06Q 10/107 709/206 |
| 2008/0158615 A1 | 7/2008 | Parkos et al. | | |
| 2009/0048704 A1* | 2/2009 | Redford | ............... | B07C 3/00 700/224 |
| 2009/0084713 A1* | 4/2009 | Miller | ............... | B07C 3/00 209/584 |
| 2009/0166438 A1* | 7/2009 | Sanchez | ............... | G06Q 10/0875 235/494 |

(Continued)

OTHER PUBLICATIONS

Paul Vogel. Rehandling of Mail Best Practices. Handbook PO-441. USPS. Apr. 2002. <https://d1ocufyfjsc14h.cloudfront.net/sites/default/files/po-441_rehandling_of_maiLbest_practices_4-02_209_kb.pdf> (Year: 2002).*

(Continued)

*Primary Examiner* — Daniel Vetter
*Assistant Examiner* — Manal A. Alsamiri
(74) *Attorney, Agent, or Firm* — Duft & Bornsen, PC

(57) ABSTRACT

Intelligent tools are provided to enable a mailcenter in a campus to provide mail service to mail service customers and perform processing of mail, in an automated manner as much as possible. Such processing may be performed include scanning and obtaining mail information from a mailpiece, and then sending such mail information to the mail service customer (as specified addressee of the mailpiece) by electronic notification via a corresponding electronic address.

24 Claims, 28 Drawing Sheets

(56) References Cited

U.S. PATENT DOCUMENTS

| | | | | |
|---|---|---|---|---|
| 2010/0230328 | A1* | 9/2010 | Bonnell | B07C 3/18 |
| | | | | 209/584 |
| 2013/0299578 | A1* | 11/2013 | Ahmed | B07C 7/005 |
| | | | | 235/385 |
| 2015/0106296 | A1* | 4/2015 | Robinson | G06F 21/62 |
| | | | | 705/339 |

OTHER PUBLICATIONS

"Intelligent Mail Barcode Question and Answers", Sep. 17, 2008.
"USPS—Mail Tracking and Reporting—How IMb Tracing™ Works", 2016.
"Steps to creating your Intelligent Mail Barcode", 2016.
M. Ironside, "Revolutionizing the Student Mail Center".
"Intelligent Mail Barcode 4-State Specification", 2015.
U.S. Appl. No. 15/339,807, Dale Walsh, filed Oct. 31, 2016.
U.S. Appl. No. 15/280,327, Dale Walsh, filed Sep. 29, 2016.
U.S. Appl. No. 15/339,832, Dale Walsh, filed Oct. 31, 2016.
"Digital Mail—Applying Accurate and Objective Metrics to Improve Mail Operations and Document Management Decisions", copyright 2019.
David Pogue; The New York Times; On Internet, You've Got (Paper) Mail; Sept 3, 2008.
Peter Nirenberg; Digital Mail Delivery-Features and Benefits; Power Point Mailcom 2001 Washington DC.

* cited by examiner

INTELLIGENT DELIVERY SYSTEM

TECHNICAL FIELD

This disclosure relates to systems, apparatuses, methodologies and other tools for processing of mail, and more specifically, tools including intelligent provisions to perform processing of mail at a mailcenter that services plural mail service customers.

BACKGROUND

The standard practice in most mailcenters across the country is to process mail as they arrive, with little, if any, planning to include provisions to track and tally incoming mail. For example, the conventional method in most mailcenters across the country is to deliver, by hand delivery, mail that is received at the mailcenter. However, a large percentage of the mail may be unwanted (e.g., "junk mail"). Further, most mailcenters have no idea where their incoming mail actually comes from, who the mail is going to, sizes of their incoming mail or the classes of their incoming mail which makes it very difficult to know the amount of unwanted mail that is being received. As a result, mailcenters spend tremendous amounts of money and time receiving, sorting, distributing and delivering mail that is often unwanted and immediately thrown away by the mail service customer. Further, most mailcenters do not charge for the sorting and delivery of incoming mail, as there is no provision to accurately account for the incoming mail, in contrast to outgoing mail.

An improved approach to process and deliver mail, such as by integrating and adapting existing information technology tools, is needed.

SUMMARY

Various tools (for example, a system, application software, a method, etc.) can be provided to perform processing of mail. For example, an intelligent delivery system may be provided to obtain information from each mail item amongst incoming mail by imprinting mailpiece identifier on the mail item, scanning the mail item to generate a digital image, performing optical character recognition (OCR) on the digital image to obtain sender/addressee information, acquire electronic address of customer associated with addressee information, and sending the digital image (and mailpiece identifier) to the electronic address as a notification which may include requests for instruction on how to process the mail item.

In another aspect, such request may be provided via a webpage accessible by a uniform resource locator (URL) link that is included in the notification. By user operation through the webpage, the customer may enter a message, or otherwise specify instructions, indicating to the mailcenter on how to process the notified mail item. For example, the page (or the notification) may provide options for specifying predetermined instructions, such as open and scan mailpiece, deliver mailpiece by hand, hold mailpiece for pickup, forward to a specified address, discard or destroy, treat as junk mail, etc.). Thus, the customer may simply activate one of the predetermined response instructions for processing the mail item.

In another aspect, incoming mail can be categorized as transactional mail or correspondence mail. Transactional mail, such as when the specified destination is a group, post office box number or mailstop (e.g., Accounts Payable, Accounts Receivable, Claims, Human Resources, Remittance, etc.) and not an individual may be processed according to predefined and repeatable workflows associated with them. In the case that a mail item is considered to be transaction mail, a transaction mail code and/or a department code can be generated as metadata. For example, the code can be marked physically on the casing of the mail item, and processing can be performed on the mail item according to a predetermined workflow corresponding to the code.

All of the remaining mail (i.e. that is not transactional) may be considered to be correspondence mail and automated as much as possible, including converting a customer's physical correspondence mail into digital mail, where desired and instructed by the customer. As an initial digitizing step, one or more digital images of the exterior of the mailpiece are captured and emailed to the customer, and providing the mail service customer with a notification of a response page to provide instructions as to how each mailpiece should be processed.

The system preferably tracks each mailpiece and the disposition decision made regarding the mailpiece in real time, and then notifies the mailcenter when a decision is made regarding the mailpiece. In the case that the delivery system is fully automated, the mailpiece identified by the mailpiece identifier is retrieved from repository and routed according to the disposition instruction. On the other hand, in other circumstances, such notification may be sent to mailcenter personnel, and the mailpiece may be retrieved by hand from a mail tray and bin (or the tray or bin may be retrieved) and placed on a processing station including a scanner, and processed through the scanner. Once the mailpiece identifier (such as in form of imprinted barcode) associated with the mailpiece is detected, the scanner then imprints the disposition instructions (such as in form of code, corresponding to, e.g., open/scan, hold, deliver, destroy, etc.) onto the mailpiece, and diverts it from the rest of the mailpieces still awaiting disposition instructions. The system may also be configured to process business rules such as escalations for mailpieces for which have a disposition decision has not yet been received within a predefined number of days, multiple notifications of mail receipt from key senders, such as governmental agencies (e.g., FDA, FAA, IRS, etc.) for compliance purposes.

BRIEF DESCRIPTION OF THE DRAWINGS

The aforementioned and other aspects, features and advantages can be more readily understood from the following detailed description with reference to the accompanying drawings wherein:

FIGS. 1A-1C (or an equivalent);

DETAILED DESCRIPTION OF EMBODIMENTS

Figure 1A:
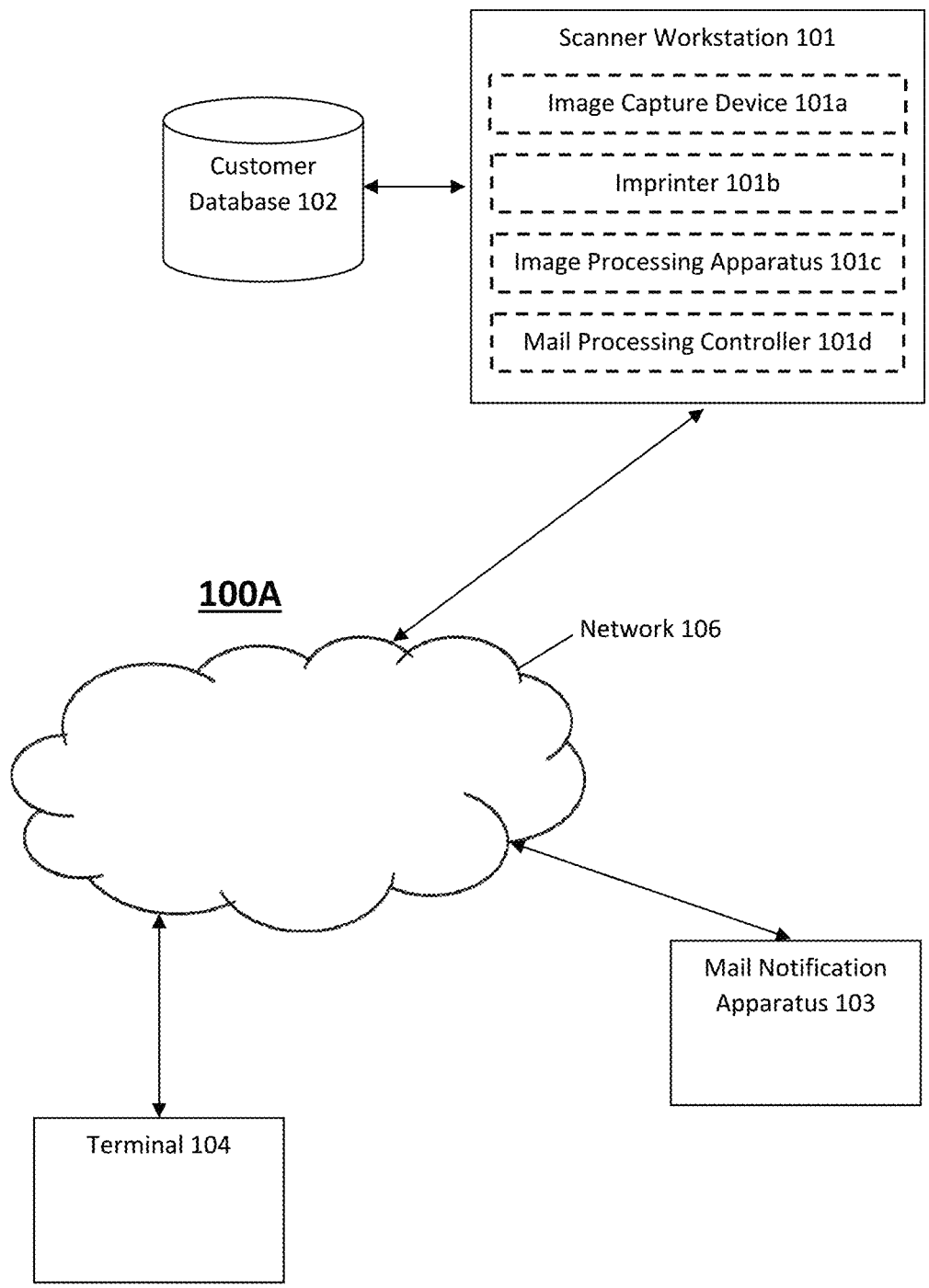
FIG. 1A shows a block diagram of a system that can include various provisions to perform processing of mail, according to an embodiment of this disclosure.

In describing preferred embodiments illustrated in the drawings, specific terminology is employed herein for the sake of clarity. However, this disclosure is not intended to be limited to the specific terminology so selected and it is to be understood that each specific element includes all technical equivalents that operate in a similar manner. In addition, a detailed description of known functions and configurations is omitted from this specification when it may obscure the inventive aspects described herein.

Various tools to facilitate processing of mail are discussed herein. It should be appreciated by those skilled in the art that any one or more of the various aspects, features and advantages discussed herein may be embedded in a mail delivery system and/or in any of various other ways, and thus while various examples are discussed herein, the inventive aspects of this disclosure are not limited to such examples described herein.

Referring now to the drawings, wherein like reference numerals designate identical or corresponding parts throughout the several views, FIG. 1A shows schematically a system 100A that includes a mail notification apparatus 103, a scanner workstation 101 and terminal 104, all of which are configured to connect to a network, such as network 106. In addition, customer database 102 is connected to the scanned workstation 101.

The mail notification apparatus 103 notifies customers that mail destined for that customer has arrived for the customer to pick-up at a mailcenter. Mail can be any item (e.g., letters, writings, documents, etc.) that is sent to the customer in a variety of forms (e.g., postcards, envelopes, packages, boxes, etc.). The mailcenter may be any location that receives, sends out or processes mail. For example, the mailcenter can be the local post office or a mailcenter of an organization or a university. The notification may be performed by sending an email from the mail notification apparatus 103 to the customer. For example, the mail notification apparatus 103 may be possessed by an organization that provides mail service via the mailcenter. The customer may have previously registered his or her email address with the organization so that when any mail for the customer arrives, the customer may be automatically informed by an email sent by the mail notification apparatus 103 to the customer. However, it should be noted that such notification is not limited to email. For example, notifications can be performed via SMS messaging, Facebook, etc.

Upon receiving the notification from the mail notification apparatus 103, the customer may be presented with information that is included in the notification. For example, the notification may have been an email that includes a selectable link [e.g., uniform resource location (URL)] that, once selected by the customer, directs the customer to a particular page on a website (made specifically for the incoming mail associated with the customer) which provides the customer with a way to specify instructions on how to process the mail at the mailcenter. For example, the customer may type in notes or instructions manually (e.g., "send mail to my house", "keep at mailcenter for me to pick up", etc.). Once the customer submits his or her manual instructions, a staff member at the mailcenter may read the customer's instructions and perform such actions corresponding to the instructions accordingly.

In another example embodiment, the customer may not need to manually specify instructions on how the mail is to be processed. Instead, the customer may simply indicate that the mail should be processed according to predetermined responsive instructions. For example, instead of a link to a webpage, the notification email may include links that include predetermined responsive instructions (e.g., "open-and-scan-mailpiece", "deliver mailpiece by hand", "hold mailpiece for pickup", "forward to a specified address", "discard or destroy and treat as junk mail", etc.). In other words, the customer may not need to manually type in instructions. He or she may simply select the predetermined responsive instructions which may cause the mail to be processed automatically according to the selected predetermined responsive instructions. Thus, there is no need to have a staff member of the mailcenter read manually typed instructions from the user as the process can be performed automatically.

The scanner workstation 101 may be a single device that includes one or more image capture devices 101a, an imprinter 101b, an image processing apparatus 101c and a mail processing controller 101d. In an example embodiment, the scanner workstation 101 may comprise multiple devices (e.g., one or more image capture devices 101a, an imprinter 101b, an image processing apparatus 101c and a mail processing controller 101d) grouped together in close proximity. While this example of this disclosure simply refers to the scanner workstation 101 in the interest of brevity, the aspects of this disclosure are applicable to a network environment having an arbitrary number of devices.

The image capture device 101a scans mail items (e.g., postcards, envelopes, packages, etc.) to obtain a digital image of an address-bearing face of the mail items. For example, the image capture device 101a may receive a large number of mail items to scan. For each properly labeled mail item amongst the mail, the image capture device 101a may capture images of the mail item using a device for capturing images (e.g., camera). Such captured images become the digital image of an address-bearing face of the mail item. The address bearing face of the mail item may be the portion of the mail item in which information regarding the sender (and his or her address) and the addressee (and his or her address) is indicated. In one example embodiment, mailcenter staff may assist the image capture device 101a in determining which portion of the mail item is the address-bearing face. In another example embodiment, the image capture device 101a may capture every face of the mail item, and let another device (e.g., image processing apparatus 101c) determine which portion is the address-bearing face. The image capture device 101a may send the digital image to the image processing apparatus 101c.

The imprinter 101b marks the mail item with a mailpiece identifier that is uniquely assigned to, the mail item. The mailpiece identifier may be randomly determined or generated and may include letters, symbols and numbers arranged in a pattern that uniquely identifies the mail item. The marking of the mail item with the mailpiece identifier may be performed through any of various means such as stamping, printing, engraving, etc. Further, the marking of the mail item may be performed before or after the image capture device 101a scans the mail item.

In one example embodiment, the imprinter 101b may send the mailpiece identifier to the image processing apparatus 101c. In another example embodiment, the imprinter 101b may imprint the mailpiece identifier onto the mail item before such mail item is captured by the image capture device 101a. Further, such mailpiece identifier may be on the address-bearing face of the mail item. Thus, when the image capture device 101a captures an image of the address-bearing face of the mail item, the mailpiece identifier may be captured as well. As a result, it is not necessary for the imprinter 101b to send the mailpiece identifier to the image processing apparatus 101c.

The image processing apparatus 101c extracts information from the digital image received from the image capture device 101a. For example, from the digital image, image processing apparatus 101c may determine any writing (whether typed or handwritten) that is on the mail item by using optical character recognition (OCR). After performing OCR on the mail obtain characters (e.g., Latin/Cyrillic alphabet, Chinese/Japanese characters, etc.), the image processing apparatus 101c may determine what sort of mail information is represented by the now-recognized characters (e.g., a person's name, company, government agency, university, a physical address of a location in real-life, etc.) by, for example, comparing information in a database (e.g., customer database 102) to the now-recognized characters. In an example embodiment, in a case that the image processing apparatus 101c receives more than one digital image (as the image capture device does not know which side is the address-bearing face of the mail item), the image processing apparatus 101c may perform OCR on each of the digital images, then compare the now recognized characters to the information in a database (e.g., customer database 102) to determine which of the digital images is the address-bearing face, as well as the information contained with the now-determined address-bearing face.

By performing such action, the image processing apparatus 101c can extract sender information (e.g., sender name, sender's address, etc.) and addressee information (e.g., addressee name, addressee's address, etc.) from the digital image. In an exemplary embodiment, in the case that the digital image includes the mailpiece identifier marked by the imprinter, the image processing apparatus 101c may extract this as well. Next, after performing extraction, the image processing apparatus 101c outputs, to the mail processing controller 101d, (i) the digital image, (ii) the sender information, (iii) the addressee information and (iv) metadata (including the mailpiece identifier) as extracted mail information.

The mail processing controller 101d, after receiving the extracted mail information, determines an electronic address (e.g., email address) of the customer who is associated with the addressee information by accessing the customer database 102 which may include a table that contains information of all of the customers associated with the mailcenter along with their corresponding electronic address (e.g., email, phone number, etc.). In an example embodiment, when the mail processing controller 101d may use the addressee information to query the customer database 102. Once the query causes matches to be made to records in the customer database 102, the mail processing controller 101d compares remainder of the metadata (received from the image processing apparatus 101c) to the records to select a record that best matches the metadata.

Once the mail processing controller 101d determines the electronic address, the mail processing controller 101d causes the mail notification apparatus 103 to send a notification (notifying arrival of mail) to the electronic address. In an example embodiment, the mail processing controller 101d may also cause the mail notification apparatus 103 to attach the digital image and the mailpiece identifier corresponding to the mail item to the notification.

In addition to performing the aforementioned actions, the mail processing controller 101d also manages the day-to-day operations of the mailcenter. For example, the mail processing controller 101d may receive instructions from the customers from which the mail processing controller 101d may execute such instructions itself or may assign mailcenter staff tasks associated with the instructions. In another example, the mail processing controller 101d may periodically manage the existing mail items that are currently stored at the mailcenter. In other words, the mail processing controller 101d may keep track of mail items that have received instructions on processing, but such instructions have not been executed yet. In another case, the mail processing controller 101d may keep track of mail items that have not yet received any instructions.

The customer database 102 includes information regarding the customers associated with the mailcenter. For example, the customer database 102 may include information such customer name, primary physical address (e.g., home), secondary physical address (e.g., work), home phone number, cell phone number, electronic address (email), etc.

The mail notification apparatus 103 transmits one or more notifications to customers who have mail at the mailcenter they have not yet personally received. In other words, after the mail processing controller 101d determines the electronic address of the customer associated with the addressee information in the mail item, the mail processing controller 101*d* causes the mail notification apparatus to generate a corresponding notification. Such notification to the electronic address of the customer may notify the customer that his or her mail item (e.g., package) has arrived. Further, such notification may also have attached the digital image and the mailpiece identifier corresponding to the mail item.

In an example embodiment, the notification may also include request for instructions on how to process the mail item. In one case, the notification may include a URL link to a web page that was created specifically for the mail item. Such webpage permits the customer to input instructions on how to process the mail item. In another example embodiment, the notification may include one or more predetermined responsive instructions (e.g., open-and-scan-mailpiece, deliver mailpiece by hand, hold mailpiece for pickup, forward to a specified address, discard or destroy and treat as junk mail).

The terminal 104 can be any computing device, including but not limited to a tablet or notebook computer, a PDA (personal digital assistant), another mobile information terminal, etc., that can communicate with other devices through the network 105.

The network 106 can be a local area network, a wide area network or any type of network such as an intranet, an extranet (for example, to provide controlled access to external users, for example through the Internet), a private or public cloud network, the Internet, etc., or a combination thereof. In addition, the network 106 preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 1B:
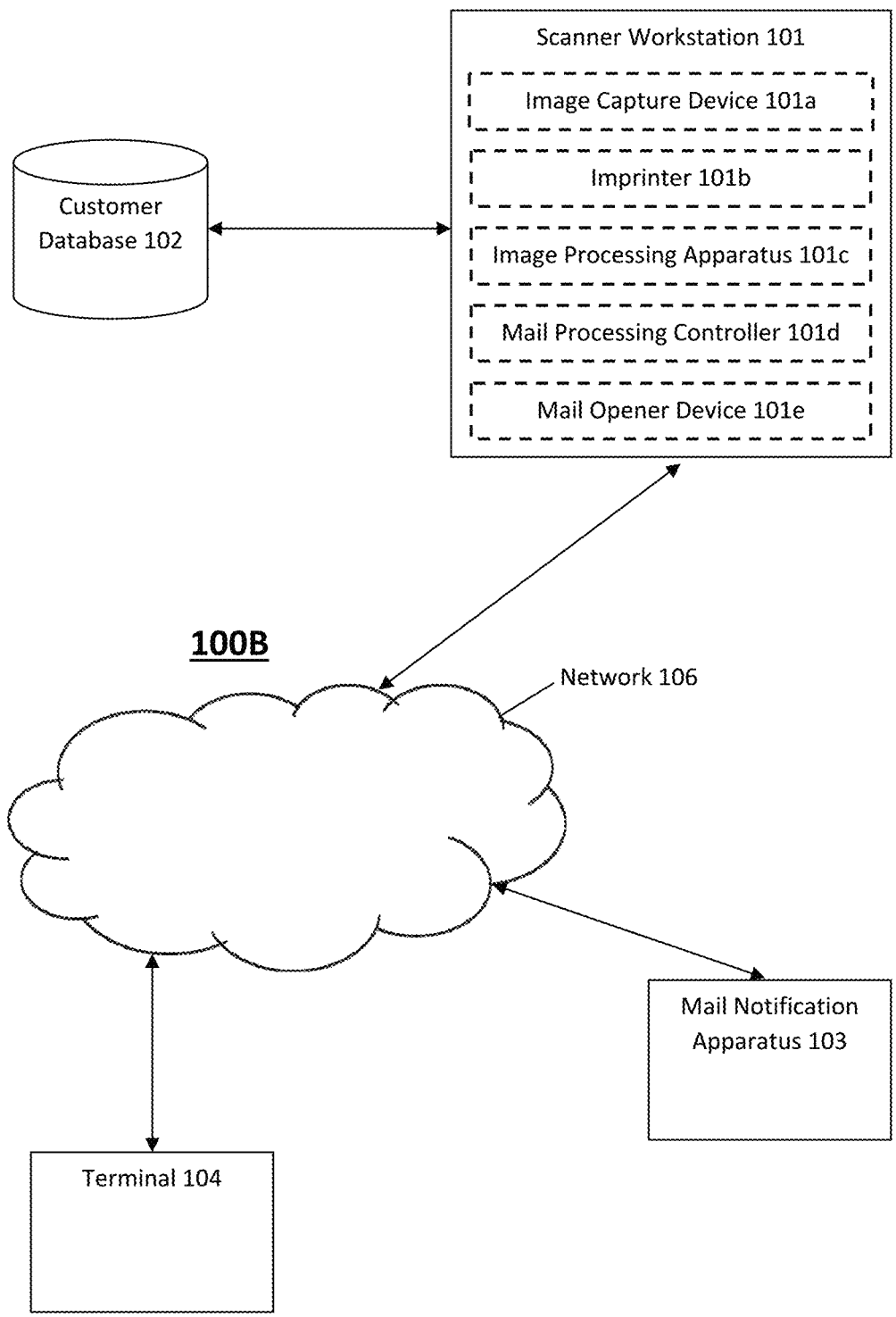
FIG. 1B shows a block diagram of a system that can include various provisions to perform processing of mail, according to another embodiment.

FIG. 1B shows schematically a system 100B according to another example embodiment. The system 100B is similar to the system 100A except that the system 100B additionally includes a mail opener device 101*e* in the scanner workstation 101.

The mail opener device 101*e* opens mail items automatically (without any human intervention) upon receiving instructions to do so from the mail processing controller 101*d*. For example, the mail processing controller 101*d* may have received instructions from a customer to open and scan the mail item (i.e. open up the casing of the mail item to obtain the contents disposed inside the mail item and then scan the contents into an electronic document). Once the mail processing controller 101*d* receives instructions to open-and-scan, the mail processing controller 101*d* sends an instruction to open the mail item to the mail opener device 101*e*. Once the mail opener device 101*e* receives such instruction from the mail processing controller 101*d*, the mail opener device 101*e* proceeds to separate the casing (e.g., envelope, packaging, etc.) from the contents (e.g., letter, documents, etc.) of the mail item. Such separation may be performed automatically by the mail opener device 101*e* using a variety of tools (e.g., knife, paper cutter, letter opener, etc.). In an example embodiment, once the contents are separated, the mail processing controller 101*d* instructs the mail opener device 101*e* to send both the casing and the separated contents to the image capture device 101*a* for the purpose of scanning the casing and the contents.

Figure 1C:
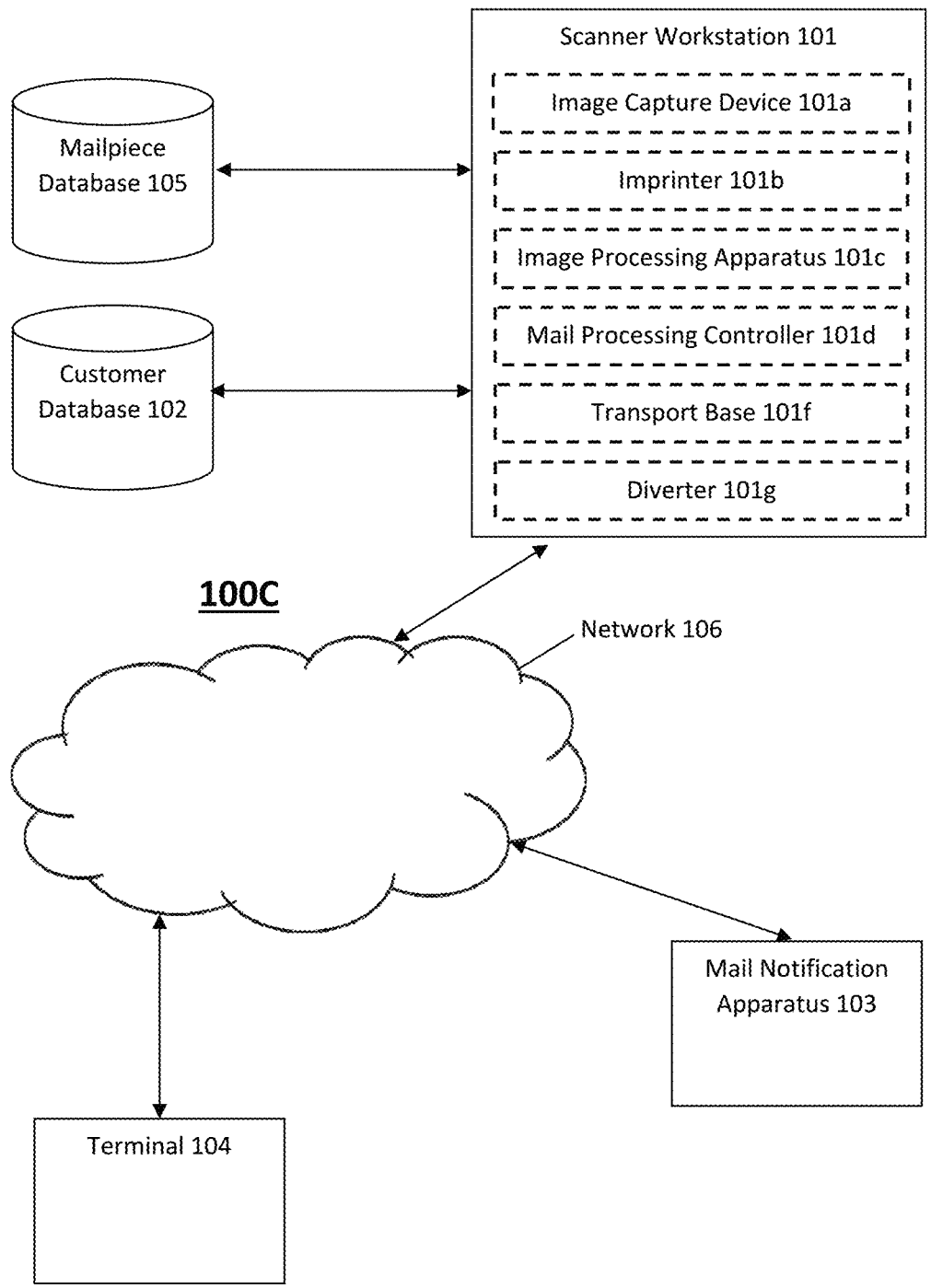
FIG. 1C shows a block diagram of a system that can include various provisions to perform processing of mail, according to yet another embodiment.

FIG. 1C shows schematically a system 100C according to another example embodiment. The system 100C is similar to the system 100A except that the system 100C additionally includes a transport base 101*f* and a diverter 101*g* in the scanner workstation 101 and a mailpiece database 105.

The mailpiece database 105 registers data for mail that has arrived at the mailcenter. Whenever the mailcenter receives incoming mail, the mail items are processed by the scanner workstation 101 and temporarily stored in a bin that is labeled with the a bin identifier that is associated with the mailpiece identifier of the corresponding mail item (the bin identifier being a different series of characters, numbers and symbols than the mailpiece identifier). However, the mail processing controller 101*d* of the scanner workstation 101 may register in the mailpiece database 105 information (such as metadata) corresponding to each mail item processed at the scanner workstation 101. For example, such metadata may include time of arrival of the mail item, weight of the mail item, size of the mail item, color of the casing of the mail item, etc. The mail processing controller 101*d* may register a digital image corresponding to the mail item in the mailpiece database 105 as well. In addition, the metadata and the digital image are registered in association with the mailpiece identifier uniquely assigned to the mail item, in the mailpiece database 105.

In an example embodiment, the metadata may also include a transaction mail indicator and a department code. When the image processing apparatus 101*c* determines from analyzing the digital image (received from the image capture device 101*a*) that such digital image corresponds to transactional mail (e.g., Accounts Payable, Accounts Receivable, Claims, Human Resources, Remittance, etc.), the image processing apparatus outputs the digital image and the metadata including a transactional mail indicator (specifying that such mail item is transaction mail) and a department code, to the mail processing controller 101*d*. The department code may correspond to one of several departments in the mailcenter. In other words, for example, one department may handle mail regarding checks, while another may handle money orders. After the mail processing controller 101*d* receives the metadata including the mailpiece identifier, the transactional mail indicator and the department code, the mail processing controller 101*d* causes the imprinter 101*b* to mark the department code on the mail item and causes the mail item to be processed according to a predetermined workflow corresponding to the department code. In other words, the imprinter 101*b* creates a physical impression (e.g., via stamping, printing, etc.) on the casing (e.g., envelope, package, etc.) of the actual mail item. Such impression may correspond to the department code which allows mailcenter staff or a device at the mailcenter to determine what kind of processing needs to be performed on the mail item according to the department code.

The transport base 101*f* allows mail to be transported in the mailcenter. For example, the transport base 101*f* may be a series of conveyor belts specifically designed to move packages from one location in the mailcenter to the other. In another example, the transport base 101*f* may connect the scanner workstation 101 with other devices (e.g., mail opener device 101*e* [not shown]) in the mailcenter.

The diverter 101*g* may divert mail items currently being transported by the transport base 101*f*. For example, the diverter 101*g* may be a crane that lifts mail items from one section of the transport base 101*f* to be placed on another section of the transport base 101*f*. In another example, the diverter 101*g* may be a switch (similar to a railroad switch) that is at the end of transport base 101*f*. When the mail processing controller 101d receives the transactional mail indicator and the department code, the mail processing controller 101d causes the diverter 101g to redirect mail items by continuously switching (from one position to another) to allow mail items to be processed according to the predetermined workflow corresponding to the department code.

Otherwise, operations of the elements of the system 100C are similar to those discussed in connection with corresponding elements of the system 100A of FIG. 1A.

Figure 2:
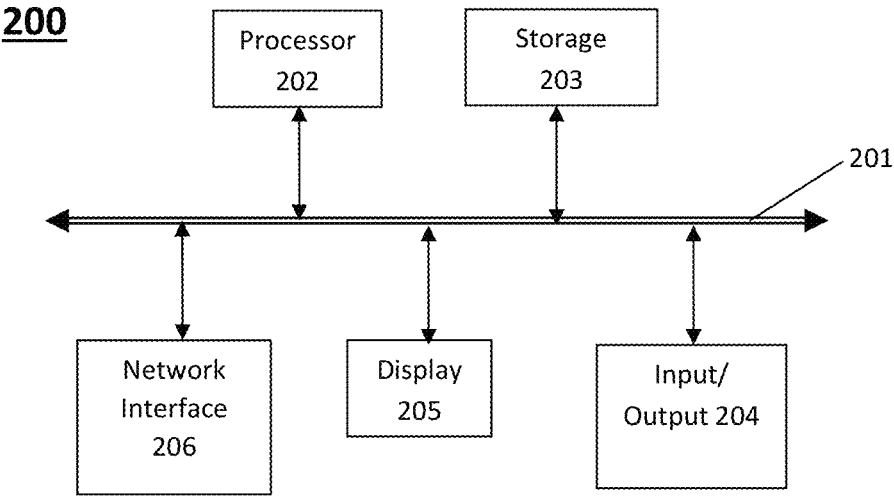
FIG. 2 shows a block diagram of an example of a configuration of a computing device that can be configured by software to operate as a mail notification apparatus.

FIG. 2 shows an example constitution of a computing device that can be configured (for example, through software) to operate (at least in part) as a mail notification apparatus (e.g., 103 in FIGS. 1A-1C). In FIG. 2, apparatus 200 includes a processor (or central processing unit) 202 that communicates with a number of other components, including memory or storage device 203, display 205, network interface 206, and other input/output (e.g., keyboard, mouse, etc.) 204, by way of a system bus 201. The apparatus 200 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as should be appreciated by those skilled in the relevant art. In the management apparatus 200, the processor 202 executes program code instructions that control device operations. The processor 202, memory/storage 203, input/output 204, display 205 and network interface 206 are conventional, and therefore in order to avoid obfuscating the inventive aspects of this disclosure, such conventional aspects are not discussed in detail herein.

The apparatus 200 includes the network interface 206 for communications through a network, such as communications through the network 107. However, it should be appreciated that the subject matter of this disclosure is not limited to such configuration. For example, the apparatus 200 may communicate with user terminals through direct connections and/or through a network to which some components are not connected. As another example, the apparatus 200 does not need to be provided by a server that services terminals, but rather may communicate with the devices on a peer basis, or in another fashion. Further, the apparatus 200 is not limited to a server or computer, but can be manifested in any of various devices that can be configured to communicate over a network and/or the Internet.

Figure 3:
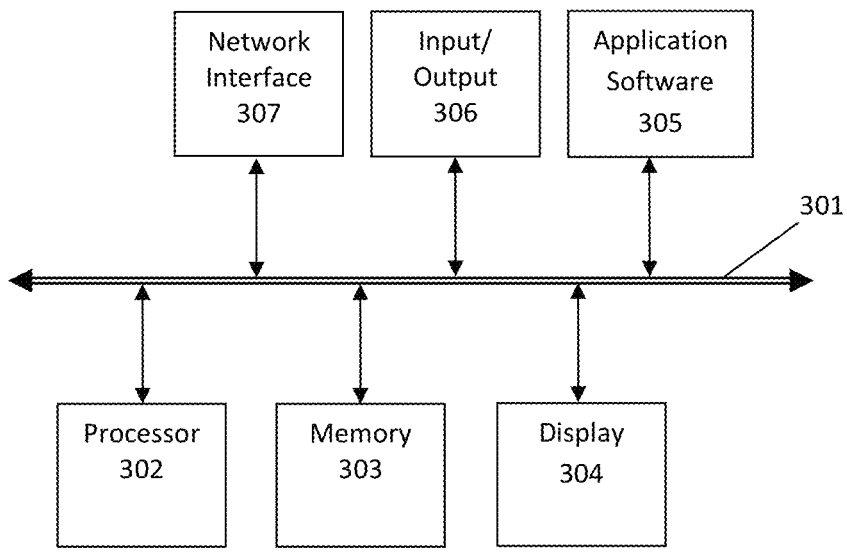
FIG. 3 shows a block diagram of an example of a configuration of a mobile device that can be configured to be a terminal.

An example constitution of the terminal 104 of FIGS. 1A-1C is shown schematically in FIG. 3. In FIG. 3, terminal 300 includes a processor (or central processing 10 unit) 302 that communicates with various other components, such as memory (and/or other storage device) 303, display 304, application software 305, input/output (such as keyboard, mouse, touchpad, stylus, microphone and/or speaker with voice/speech interface and/or recognition software, etc.) 306 and network interface 307, by way of an internal bus 301.

The memory 303 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NVRAM), etc.].

The network interface 307 provides a connection (for example, by way of an Ethernet connection or other network connection which supports any desired network protocol such as, but not limited to TCP/IP, IPX, IPX/SPX, NetBEUI, etc.) to the network to which the computer 300 is connected (e.g., network 106 of FIGS. 1A-1C).

Additional aspects or components of the computer 300 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Figure 4:
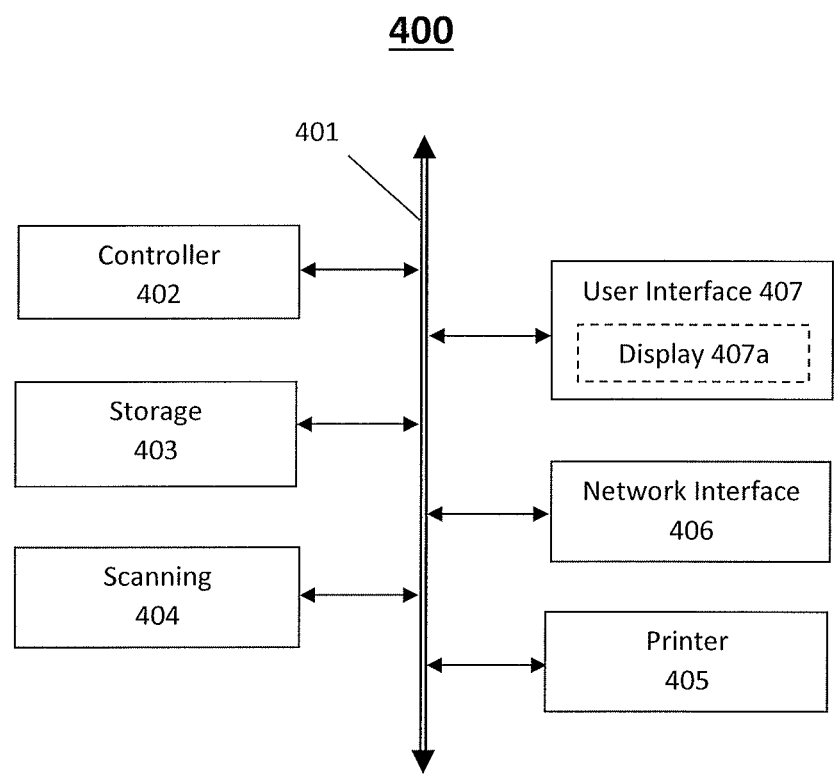
FIG. 4 shows a block diagram of an example of a configuration of a scanner workstation.

FIG. 4 shows a schematic diagram of a configuration of a scanner workstation (e.g., 101) that may include a scanner (e.g., image capture device 101a) and an imprinter (e.g., imprinter 101b). The scanner workstation 400 shown in FIG. 4 includes a controller 402, and various elements connected to the controller 402 by an internal bus 401. The controller 402 controls and monitors operations of the scanner workstation 400. The elements connected to the controller 402 include storage 403 (for example, random access memory, read-only memory, hard disk drive, portable storage media drive such as for optical discs, magnetic discs, magneto optical discs, etc., semiconductor memory cards, combinations of storage media, etc.), scanner 404, printer 405, a network interface (I/F) 406 and a user interface 407.

Storage 403 can include one or more storage parts or devices [e.g., a read only memory (for example, ROM, PROM, EPROM, EEPROM, etc.), a random access memory (RAM), a hard disk drive (HDD), portable media (for example, floppy disk, optical disc, magnetic discs, magneto-optical discs, semiconductor memory cards, etc.) drives], and program code instructions can be stored in one or more parts or devices of storage 403 and executed by the controller 402 to carry out the instructions. Such instructions can include instructions for performing specified functions (such as printing, scanning, faxing, copying, e-mailing, etc.) of the scanner workstation 400, to enable the scanner workstation 400 to interact with a terminal, as well as perhaps other external devices, through the network interface 407, and interactions with users through the user interface 407.

The network interface 406 is utilized by the scanner workstation 400 to communicate via a network with other network-connected devices such as a terminal, a server and receive data requests, print (or other) jobs, user interfaces, and etc.

The user interface 407 includes one or more electronic visual displays that display, under control of controller 402, information allowing the user of the scanner workstation 400 to interact with the scanner workstation 400. The electronic visual display can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the scanner workstation 400, so as to allow the operator to interact conveniently with services provided on the scanner workstation 400, or with the scanner workstation 400 serving as terminal for accessing electronic data or other content through the network. User interfaces or other contents received through the network via the network interface 406 can be displayed on the display screen.

The display screen does not need to be integral with, or embedded in, a housing of the scanner workstation 400, but may simply be coupled to the scanner workstation 400 by either a wire or a wireless connection. The user interface 407 may include keys and/or buttons (such as graphical keys or buttons, or other graphical elements, of a GUI on a touch-screen display 407*a*) for inputting information or requesting various operations. Alternatively, the user interface 407 and the display screen may be operated by a keyboard, a mouse, a remote control, voice recognition, or eye-movement tracking, or a combination hereof.

Scanner 404, printer 405, and network interface 406 are otherwise conventional, and therefore, a detailed description of such conventional aspects is omitted in the interest of clarity and brevity. The scanner workstation 400 can have any or all of the functions of similar devices conventionally known, such as for scanning, editing and storing images, sending a fax, sending and receiving e-mails with or without attachments, accessing files by FTP or another protocol or facility, surfing the Web, scan-to-folder, scan-to-email, etc. Further, multi-functional devices or multi-function peripheral devices can play a prominent role to convert hardcopy documents to electronic documents.

FIGS. 5A-5D show processes that can be performed in, for example, any of the systems 100A-100C (illustrated in FIGS. 1A-1C, respectively), according to an example embodiment. It should be noted that the mailcenter and the mail processing server may correspond to or include scanner workstation 101 and the mail notification apparatus 103 (or any databases presented in FIGS. 1A-1C).

Figure 5A:
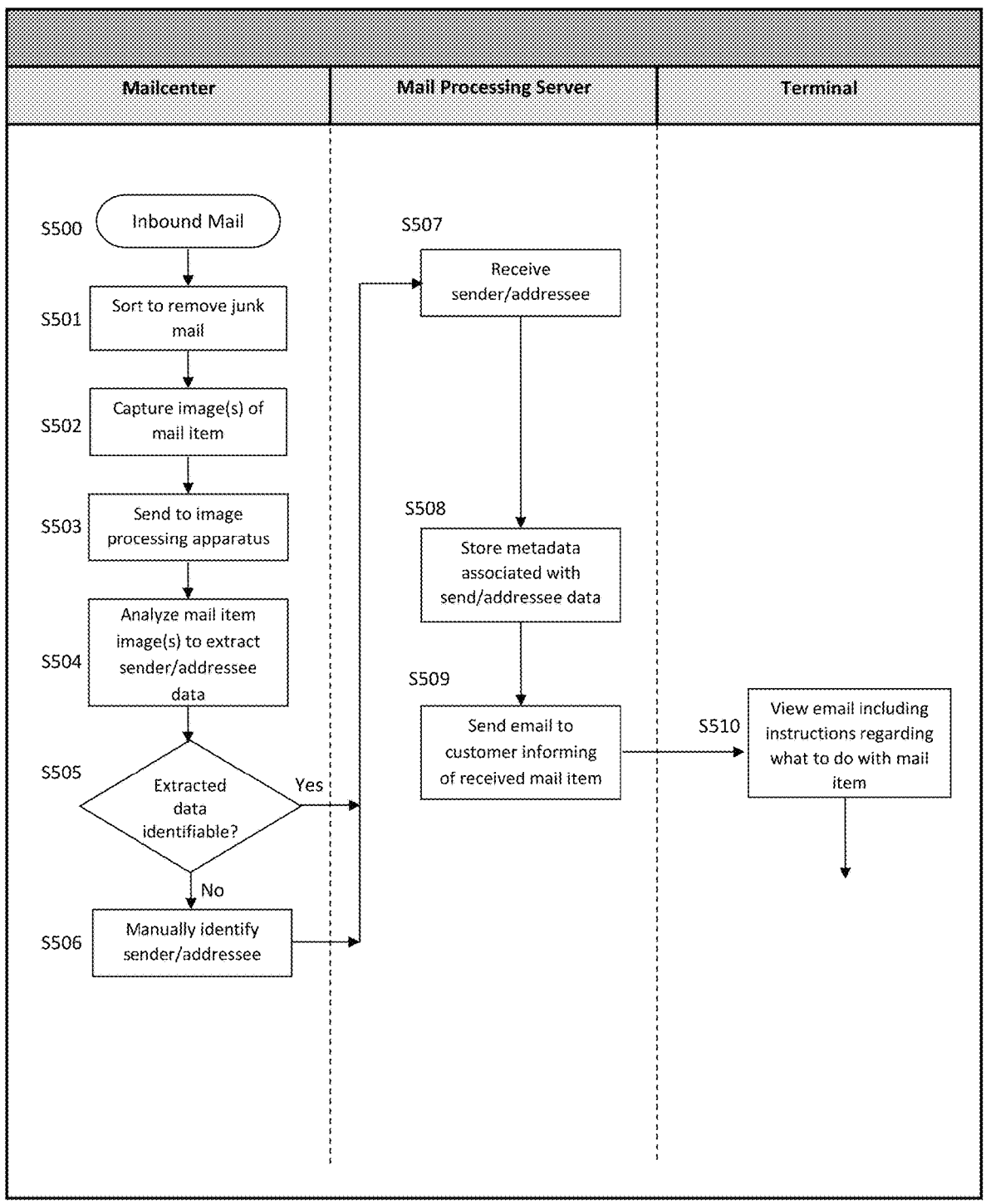
FIG. 5A shows a flow chart for a method (and communication flow) that can be performed in any of the systems of FIGS. 1A-1C (or an equivalent)

FIG. 5A shows a process that can be performed in, for example, any of the systems 100A-100C (illustrated in FIGS. 1A-1C, respectively), according to an example embodiment.

When the mailcenter receives incoming mail (S500), the mailcenter sorts through the incoming mail to remove any junk mail (S501). Next, an image capture device captures images (e.g., such as an address-bearing face) of the mail item (S502). Afterwards, the image capture device sends the captured images to an image processing apparatus (S503). The image processing apparatus analyzes the captured images to extract sender/addressee data from the captured images (S504).

However, the mail item may not always have legible writing or the font may be unrecognizable, which may be reflected in the captured image. Thus, in the case that the extracted data is identifiable (or, in other words, the sender/addressee data can be clearly established) (S505, yes), the mailcenter sends the extracted data to the mail processing server (S507). Otherwise, in the case that the extracted data is not identifiable (S505, no), the sender/addressee data is manually determined by, for example, mailcenter staff (S506). Next, the mail processing server stores metadata associated with send/addressee data (S508). Then, the mail processing server sends an email to a customer associated with the addressee information (S509). After receiving the email, the user opens the email to view its contents, including input instructions (S510).

Figure 5B:
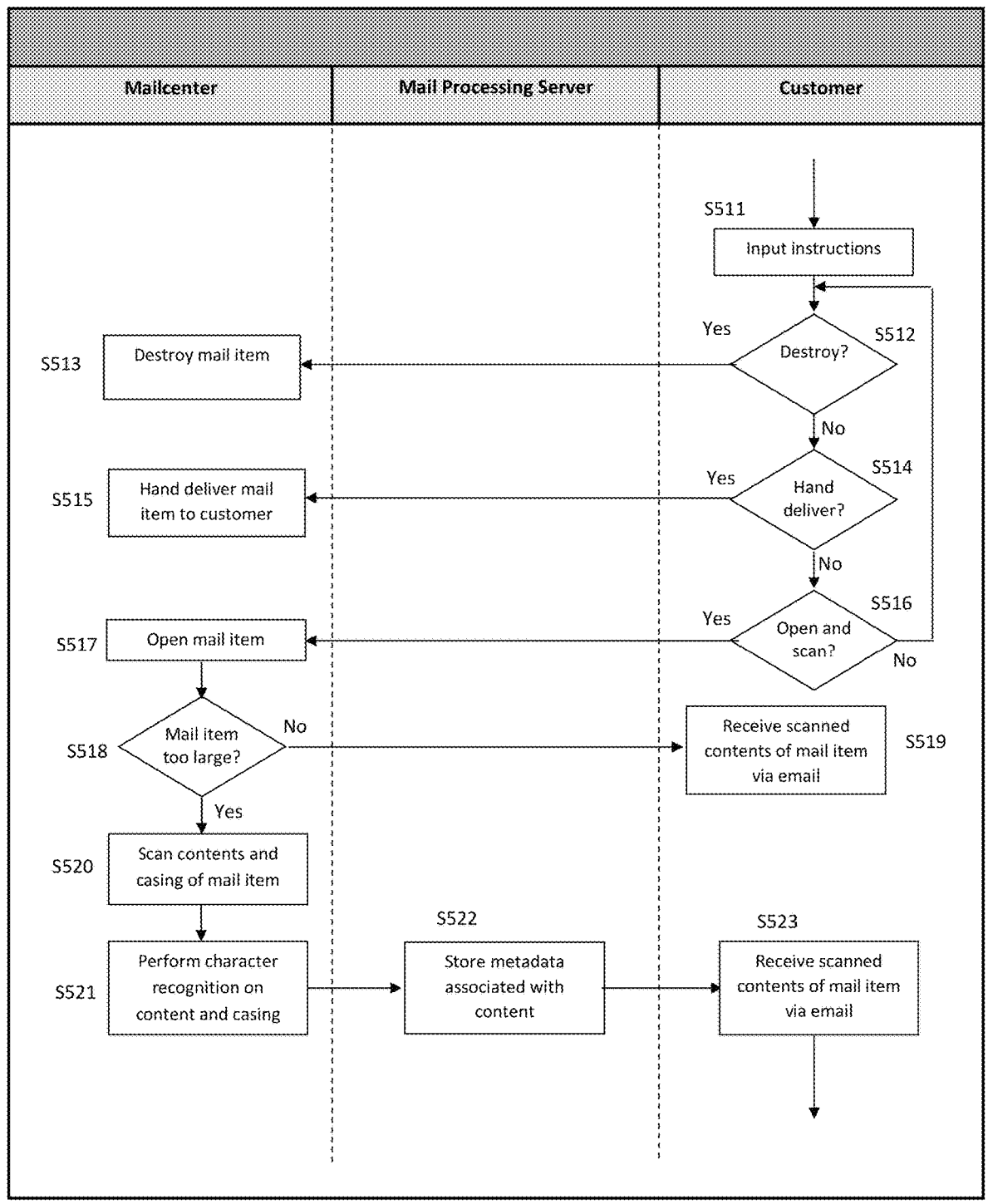
FIG. 5B shows a flow chart for a method (and communication flow) that can be performed in any of the systems of FIGS. 1A-1C (or an equivalent)

FIG. 5B shows a process that can be performed in, for example, any of the systems 100A-100C (illustrated in FIGS. 1A-1C, respectively), according to an example embodiment.

After receiving the instructions from the customer, software on the terminal determines what kind of instructions were inputted by the user. In the case that the instructions are to destroy the mail item (S512, yes), the mailcenter destroys the mail item (S513). Otherwise (S512, no), in the case that the instructions are to hand deliver the mail item (S514, yes), the mailcenter hand delivers the mail item to the intended addressee (S515). Otherwise (S514, no), in the case that the instructions are to open and scan the mail item (S516, yes), the casing (e.g., packaging, mail item, etc.) of the mail item is opened to obtain the contents inside (S517). Otherwise (S516, no), the process repeats. Next, a determination is made on whether the mail item is too large to scan (S518). In the case that the mail item is not too large (S518, no), the contents are scanned and sent to be received by the terminal (S519). On the other hand, if the mail item is too large (S518, yes), the contents and the casing are scanned (S520). Then, optical character recognition (OCR) is performed on the scanned content and casing (S521). Next, the scanned content and casing is sent to the mail processing server which creates and stores metadata associated with the scanned content (S522). Afterwards, the scanned content is sent to the intended addressee via email to the terminal (S523).

Figure 5C:
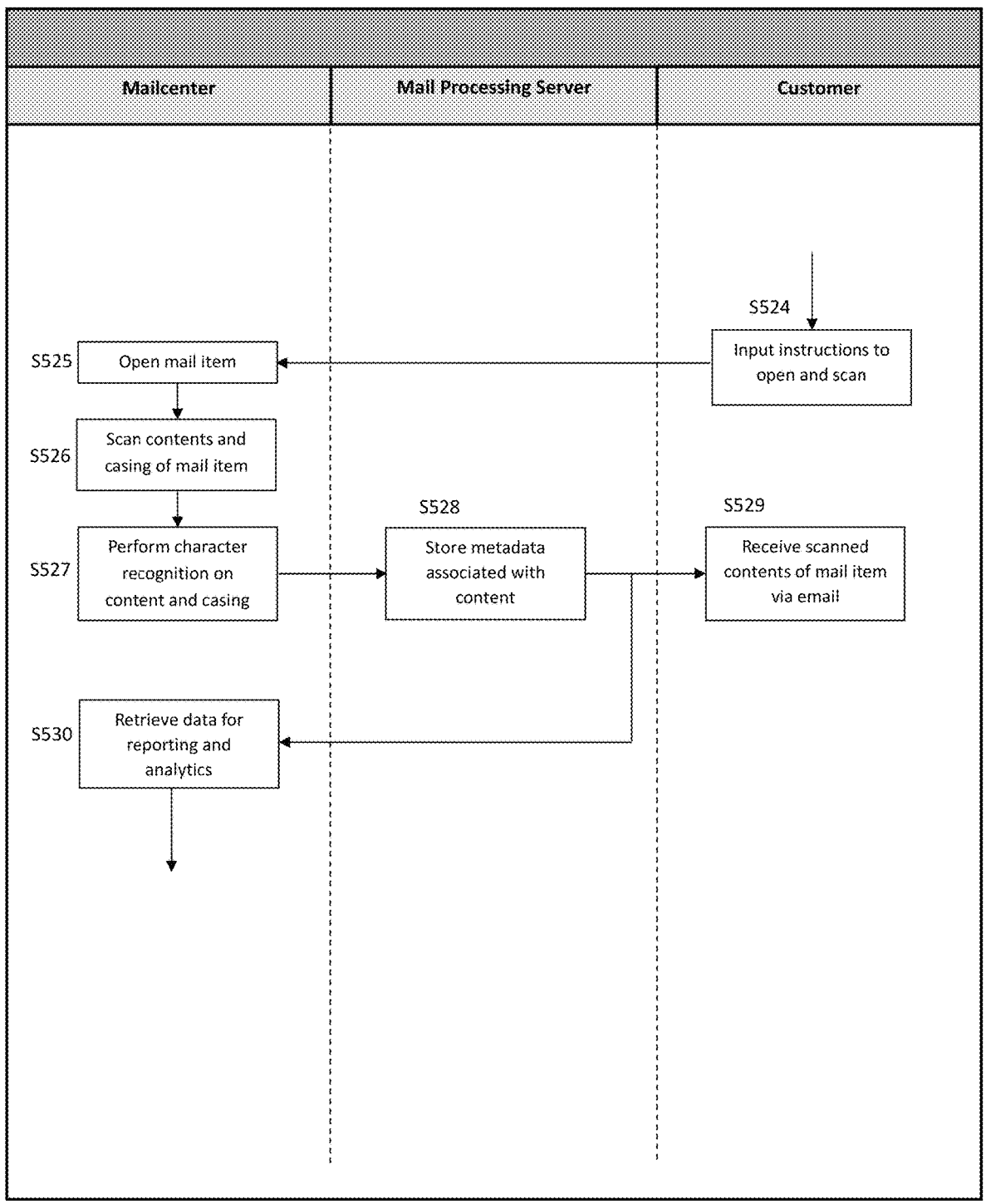
FIG. 5C shows a flow chart for a method (and communication flow) that can be performed in any of the systems of FIGS. 1A-1C (or an equivalent)

FIG. 5C shows a process that can be performed in, for example, any of the systems 10 100A-100C (illustrated in FIGS. 1A-1C, respectively), according to another example embodiment.

After receiving an instruction to open and scan the mail item (S524), a command is sent to a mail opener device which proceeds to open the mail item (S525). Next, the image capture device scans the content and casing of the mail item as a digital images (S526). Then, the image processing apparatus performs character recognition (e.g., OCR) on the digital images corresponding to the content and casing of the mail item (S527). Next, the digital images which had OCR performed thereon and the metadata associated with the mail item is sent to the mail processing server which proceeds to store the metadata (S528), send the digital images to the customer (S529), and causes the mail processing controller to retrieve data corresponding to the mail item for reporting and analytics (S530).

Figure 5D:
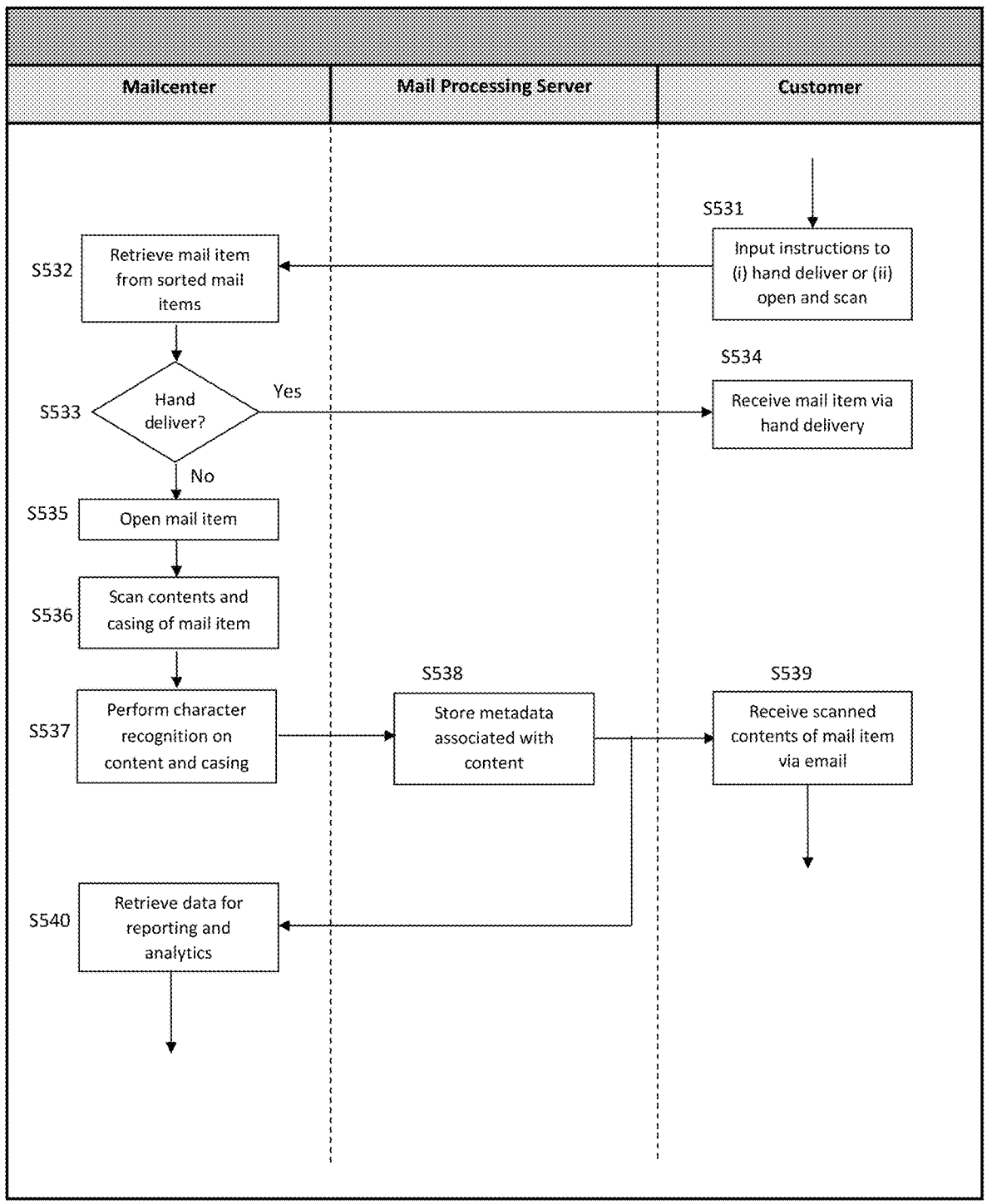
FIG. 5D shows a flow chart for a method (and communication flow) that can be performed in any of the systems of Figs.

FIG. 5D shows a process that can be performed in, for example, any of the systems 100A-100C (illustrated in FIGS. 1A-1C, respectively), according to an example embodiment.

After receiving an instruction to open and scan the mail item or hand deliver the mail item (S531), the mail item is retrieved from sorted mail (S532). In the case that the instruction is to hand deliver the mail item (S533, yes), the mailcenter hand delivers the mail item to the intended addressee (S534). On the other hand, in the case that the instruction is to open and scan the mail item (S533, no), the casing (e.g., packaging, mail item, etc.) of the mail item is opened to obtain the contents inside (S535). Next, the image capture device scans the content and casing of the mail item as a digital images (S536). Then, the image processing apparatus performs character recognition (e.g., OCR) on the digital images corresponding to the content and casing of the mail item (S537). Next, the digital images which had OCR performed thereon and the metadata associated with the mail item is sent to the mail processing server which proceeds to store the metadata (S538), send the digital images to the customer (S539), and causes the mail processing controller to retrieve data corresponding to the mail item for reporting and analytics (S540).

Figure 6A:
FIG. 6A-6D show examples of pieces of mail.

FIG. 6A shows an example of a mail item that has not yet been processed (i.e. newly arrived mail).

Figure 6B:

FIG. 6B shows an example of a mail item that has been imprinted (e.g., by imprinter 101*b* of a scanner workstation 101 of FIGS. 1A-1C) with a mailpiece identifier. Such mailpiece identifier may be a series of characters, number or symbols that uniquely identifier a mail item.

Figure 6C:

FIG. 6C shows an example of a mail item with barcodes labeled under the addresses of each of the sender and addressee. Such barcodes enable, for example, an image processing apparatus to determine the address information of each of the sender and addressee without having to resort to performing OCR.

Figure 6D:
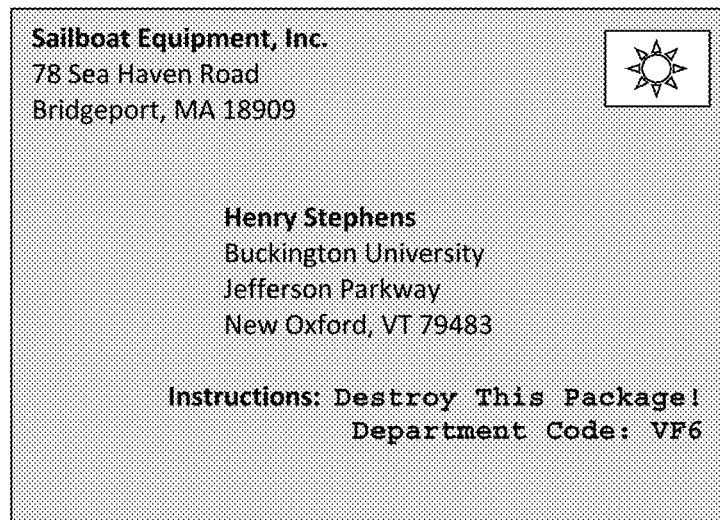

FIG. 6D shows an example of a mail item that has been processed. In this case the mail item has been printed with instructions and a department code. For example, the mail processing controller may determine whether mail processing instructions have been registered in association with the mailpiece identifier of the mail item. When such registration has been made, the mail processing controller causes the mail item to be printed with instructions and/or a department code. For example, the department code may indicate which department the mail item should be ultimately processed at. The instructions may indicate to, for example, department staff on how to process the mail item.

Figure 7:
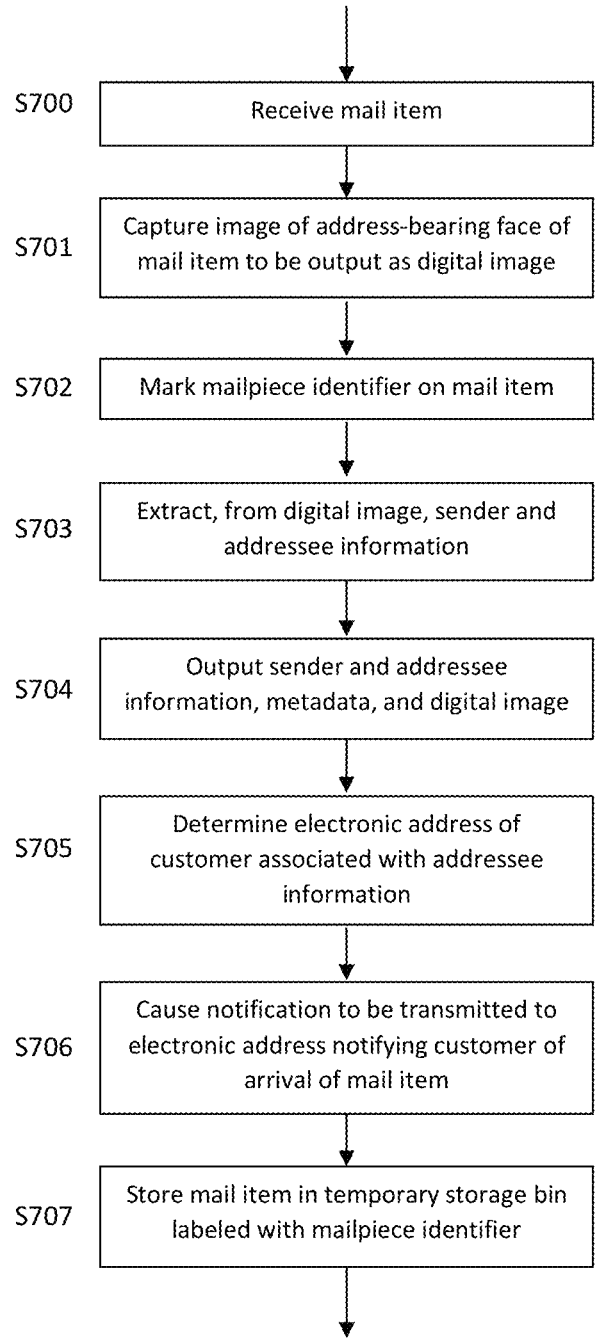
FIG. 7 shows a flow chart for a method that can be performed in any of the systems of FIGS. 1A-1C (or an equivalent)

FIG. 7 shows a method that can be performed by a scanner workstation device (e.g., 103 in FIG. 1) according to an example embodiment.

In the following example, a university (Buckington University) provides mail services on its campus to the university community (e.g., students, professors, staff members, etc.) via a mailcenter. The mail services, for example, may include delivering the mail on campus (e.g., dormitories, personal offices, cubicles, etc.). The mail may come in a variety of forms such as envelopes, postcards, packages, etc.

Such process commences when the mailcenter receives mail from one or more carriers (e.g., United States Post Office, Federal Express, United Postal Service, etc.). Once the mail has been received, each mail item (or mail piece) amongst the mail is processed automatically by one or more scanner workstations disposed throughout the mailcenter. The scanner workstations may include a mail processing controller, one or more image capture devices, an imprinter and an image processing apparatus. Once a particular scanner workstation receives at least one mail item (S700), the mail be transported (e.g., moved) throughout different portions of the scanner workstation via a variety of means (e.g., conveyor belts, etc.). For example, the first device to encounter the mail item may be the image capture device which captures an image of the address-bearing face of mail item to be output as a digital image (S701).

The address-bearing face of the mail item includes the side of the mail item that contains sender and addressee information. The sender information may include the name of the sender (e.g., person's name, company name, government agency, etc.) and the physical address (in a real-world location) of the sender. Likewise the addressee information may be similar in that the addressee information may also include the name of the addressee and the physical address (in a real-world location) of the sender. It should be noted that the sender may be from a different state or another country.

For example, such action may be performed by mailcenter staff at the scanner workstation determine the address-bearing face of the mail item. This may be required when the writing on the address-bearing face of the mail item is illegible or the shape of the package makes the package not feasible to be scanned by the image capture device. In an example embodiment, the image capture device may simply capture images corresponding to every side of the package and let another device (e.g. image processing device) determine which captured image includes the address-bearing face. After obtaining the captured image(s) as a digital image, the mail item may be transported to the imprinter that marks (or prints) a mailpiece identifier which is a unique series of characters, letters, and/or numbers onto the mail item (S702). Next, the image capture device sends the digital image of the address-bearing face of the mail item to the image processing apparatus. Likewise, the imprinter may send the mailpiece identifier to the image processing apparatus.

Then, the image processing apparatus extracts sender and addressee information from the digital image (S703). The image processing apparatus may perform the extraction by, for example, performing optical character recognition (OCR) in which the image processing apparatus determines characters (e.g., letters, numbers, symbols, etc.) that are present on the digital image. Afterwards, the image processing apparatus determines the sender and addressee information by comparing the pattern of the characters to information in a database (e.g., customer database, third-party sites, etc.).

In an example embodiment, the image processing apparatus may also use OCR in determining which is the address-bearing face, such as, for example, by recognizing each character pattern in the digital image and comparing each recognized character pattern to information in a database to determine which character patterns are sender or addressee information and which character patterns are not sender or addressee information.

Further, the image processing apparatus may also generate metadata corresponding to the mail item. Metadata, may be, for example, data which describes data. In other words, metadata may not be displayed to the user when he or she opens a file but is accessed by other means (e.g., command-line interface) in order to view characteristics or properties of the file. For example, the primary purpose of an electronic newspaper article is to display the text of the article. Data describing the electronic newspaper article (e.g., date that the file was created, author, category, country of origin, etc.) may not be displayed with the text itself. To access the metadata describing the article, the user may, for example, use a command-line interface or a program on the operating system (OS) of the terminal to view the metadata describing the electronic newspaper article.

In this case, the metadata could be, for example, the time (hour, day, month, year, etc.) the mail item was received, the time that the digital image was captured, the size of the casing (e.g., package, envelope, etc.) of the mail item, the weight of the mail item, etc. Next, the image processing apparatus outputs the sender and addressee information, the metadata, and the digital image to the mail processing controller (S704). In response, the mail processing controller determines an electronic address of a customer who is associated with the addressee information (S705). For example, the addressee information may indicate that Henry Stephens is the intended receiver of the mail item. Further, Henry may have an electronic address henry.stephens@buckington.edu that is registered with a database (e.g., customer database) of the mailcenter. Thus, when the mail processing controller compares the addressee information with the information in the database, the mail processing controller may discover the electronic address of Henry.

After discovering the electronic address of the customer associated with the addressee information, the mail processing controller may then cause a mail notification apparatus to transmit a notification to the electronic address notifying the customer of arrival of the mail item (S706). Such notification may be, for example, an email to the customer informing him or her that a package (or envelope, postcard, etc.) has arrived. The notification may also include the mailpiece identifier and the digital image. The digital image provides the customer with the ability to determine what mail item was sent to him or her by viewing the sender information. For example, the customer may be able to determine from the sender information present from the digital image whether the mail item is expected or junk mail.

It should be noted that the capturing of the address-bearing face of the mail item, the marking of the mail item and the extraction of the sender and addressee information may be performed at a single location without the necessity to move or transport the mail item. In other words, the mail item may just be static while all of the aforementioned operations are performed. Afterwards, the scanner workstation may automatically retrieve a temporary storage bin to hold the mail item and mark the bin with the previously generated mailpiece identifier. Next, the scanner workstation may place the mail item into the temporary storage bin and send both the mail item and the bin to a location for storage (S707).

Figure 8:
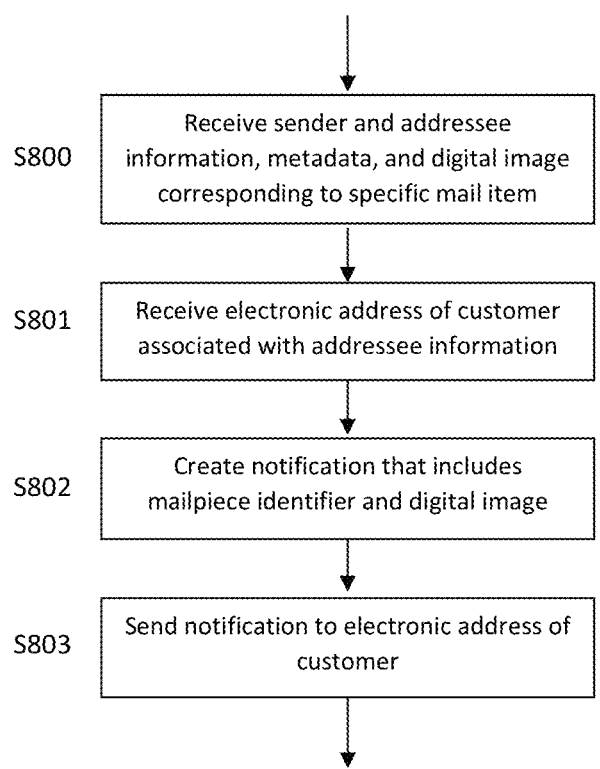
FIG. 8 shows a flow chart for a method that can be performed in any of the systems of FIGS. 1A-1C (or an equivalent)

FIG. 8 shows a method that can be performed by a mail notification apparatus (e.g., 101 in FIG. 1) according to an example embodiment.

The mail notification apparatus receives sender and addressee information, metadata, and digital image from the scanner workstation (S800). Further, the mail notification apparatus may also receive an electronic address of a customer who is associated with the addressee information (S801). In response, the mail notification apparatus generates a notification that includes the mailpiece identifier and the digital image. The notification may, for example, be an email that includes a message indicating that there has been one or more mail items that have been received at the mailcenter. In one example embodiment, the notification may also include a URL link to a web page that was created specifically for the mail item. Such webpage permits the customer to input instructions on how to process the mail item. In another exemplary embodiment, the notification may include one or more predetermined responsive instructions (e.g., open and-scan-mailpiece, deliver mailpiece by hand, hold mailpiece for pickup, forward to a specified address, discard or destroy and treat as junk mail). After the notification is created, the mail notification apparatus sends the notification to the customer via the electronic address (S803).

Figure 9:
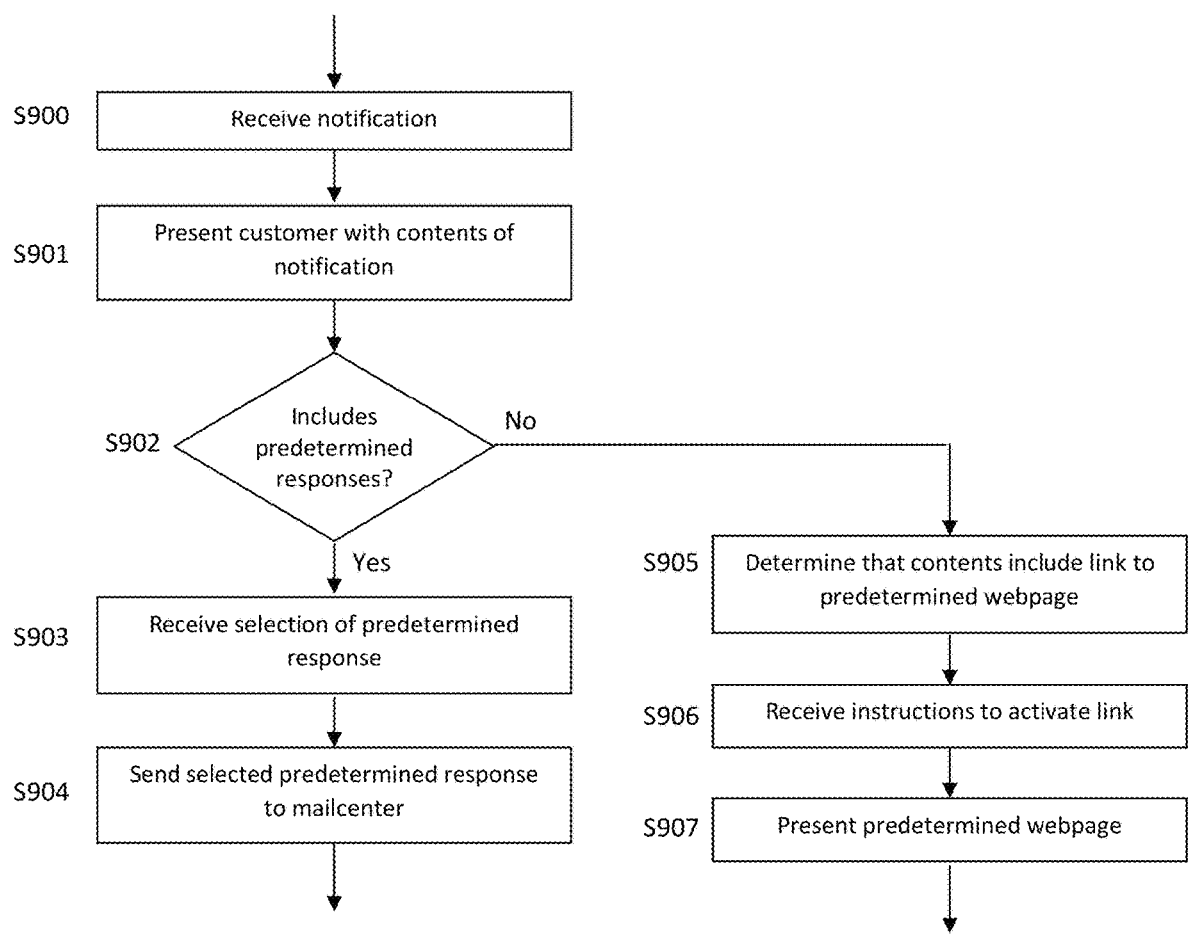
FIG. 9 shows a flow chart for a method that can be performed in any of the systems of FIGS. 1A-1C (or an equivalent)

FIG. 9 shows a method that can be performed by a terminal (e.g., 101 in FIG. 1) according to an example embodiment.

Figure 10A:
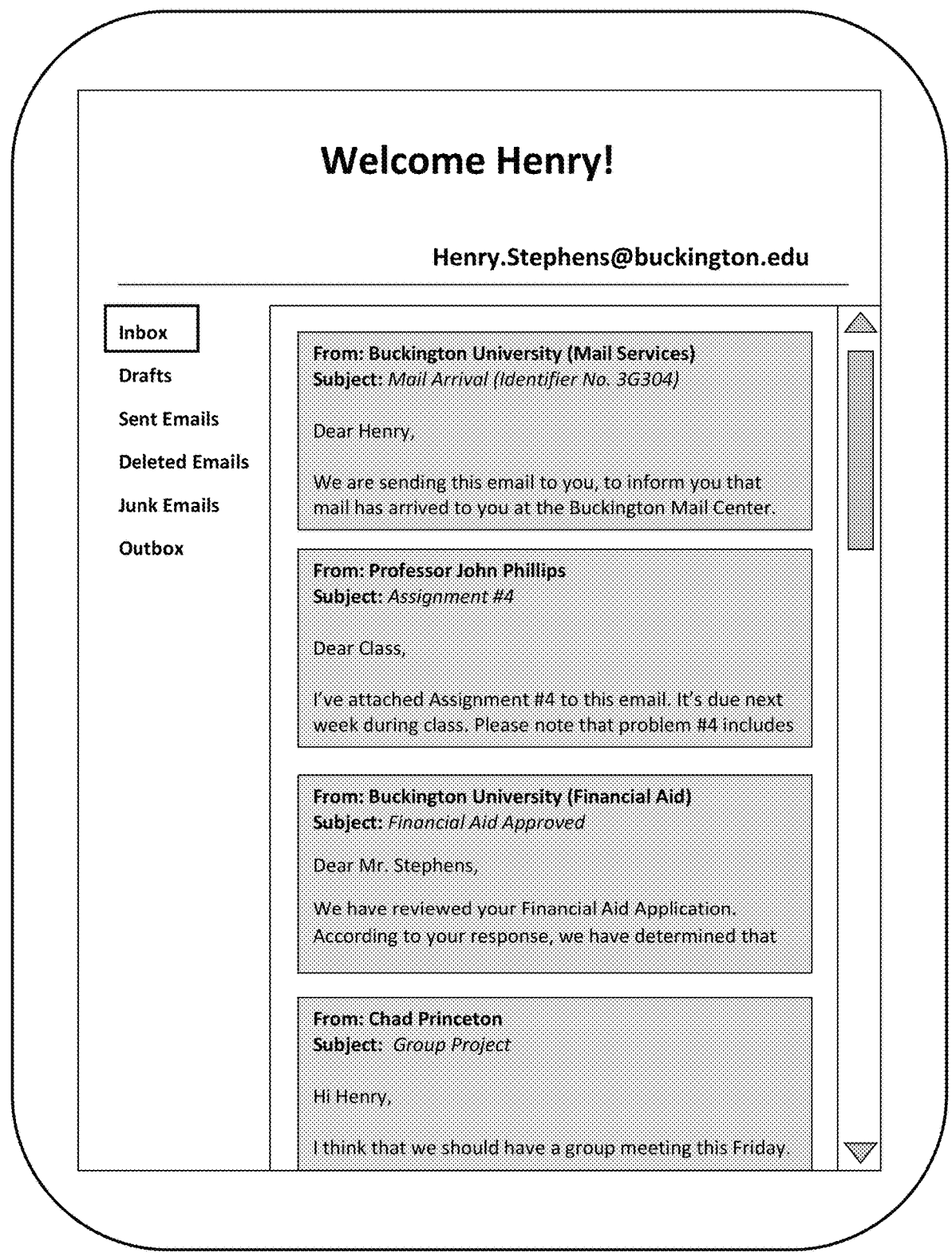
FIGS. 10A-10G show examples of electronic notifications sent in any of the systems of FIGS. 1A-1C (or an equivalent)

After the mail notification apparatus sends instructions to one or more customers via, for example, an electronic address of the customer, one of the customer's terminal (e.g., tablet, personal computer, smartphone, etc.) may receive such notification (S900). Such notification may be presented to the customer via an application on the terminal (S901). For example, the application may be a e-mail client or browser, or another software on the customer's terminal that opens up emails for the customer to view, such as shown in FIG. 10A.

The notification may include a request by the mailcenter for instructions on processing the mail item associated with the unique identifier. For example, the instructions may be in the form of predetermined responses that are embedded into the notification. In such case, the customer may simply activate the predetermine response which causes a message associated with the predetermined response to automatically be sent to the mailcenter. In another example, the notification may include a link to a predetermined (pre-generated) webpage at a web site maintained (or utilized) by the mailcenter. Such webpage may allow a customer to manually input a message on how he or she wants processing to be performed on the mail item.

Figure 10B:
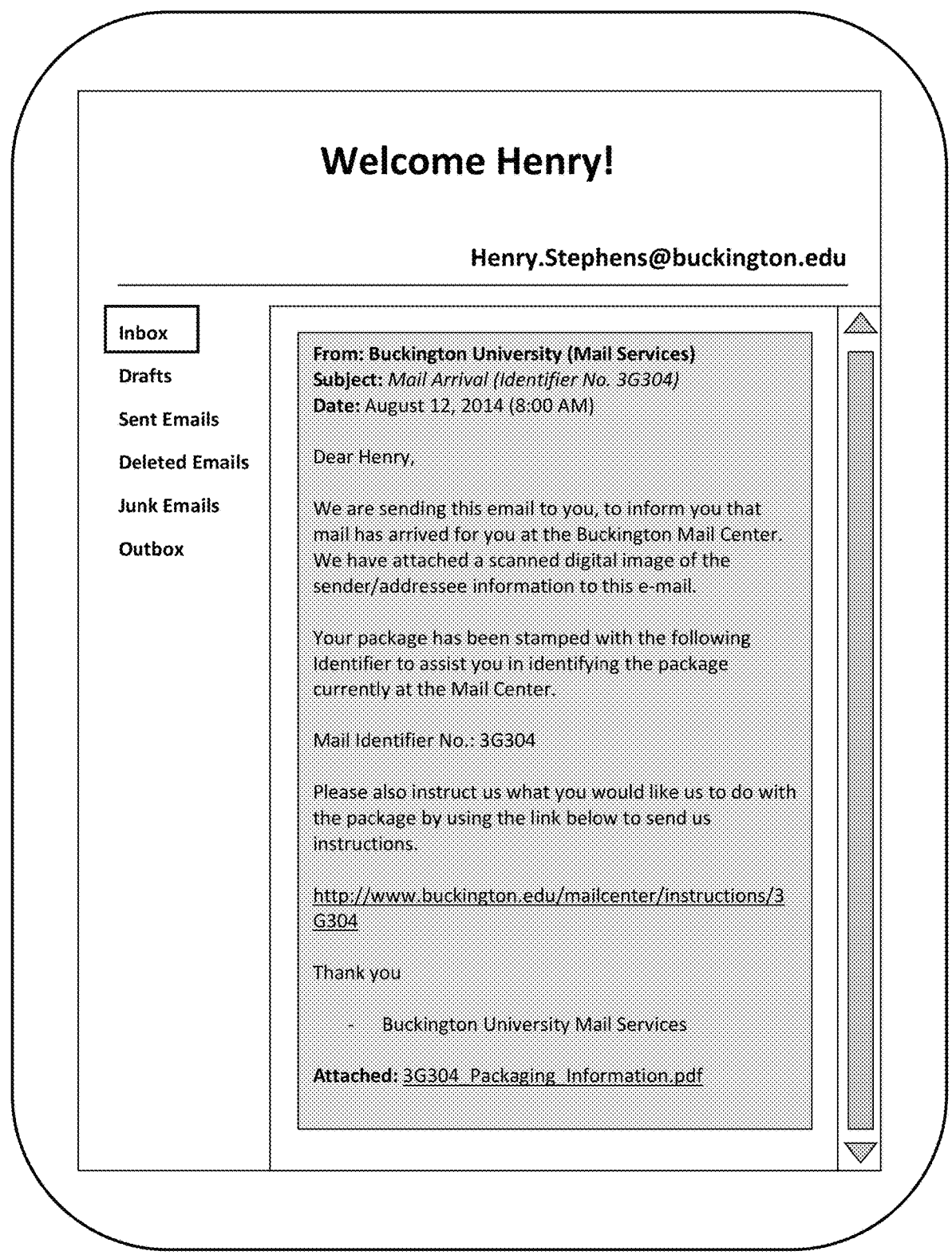

In the case that the notification includes predetermined responsive instructions (S902, no), the terminal may determine that the contents include link to predetermined webpage (S905). For example, the notification can be in the form of an email that includes a URL link to a webpage generated by the mailcenter, such as shown in FIG. 10B. As indicated in the email, such link provides the means for directing the mailcenter on how to process the mail item.

Figure 10C:
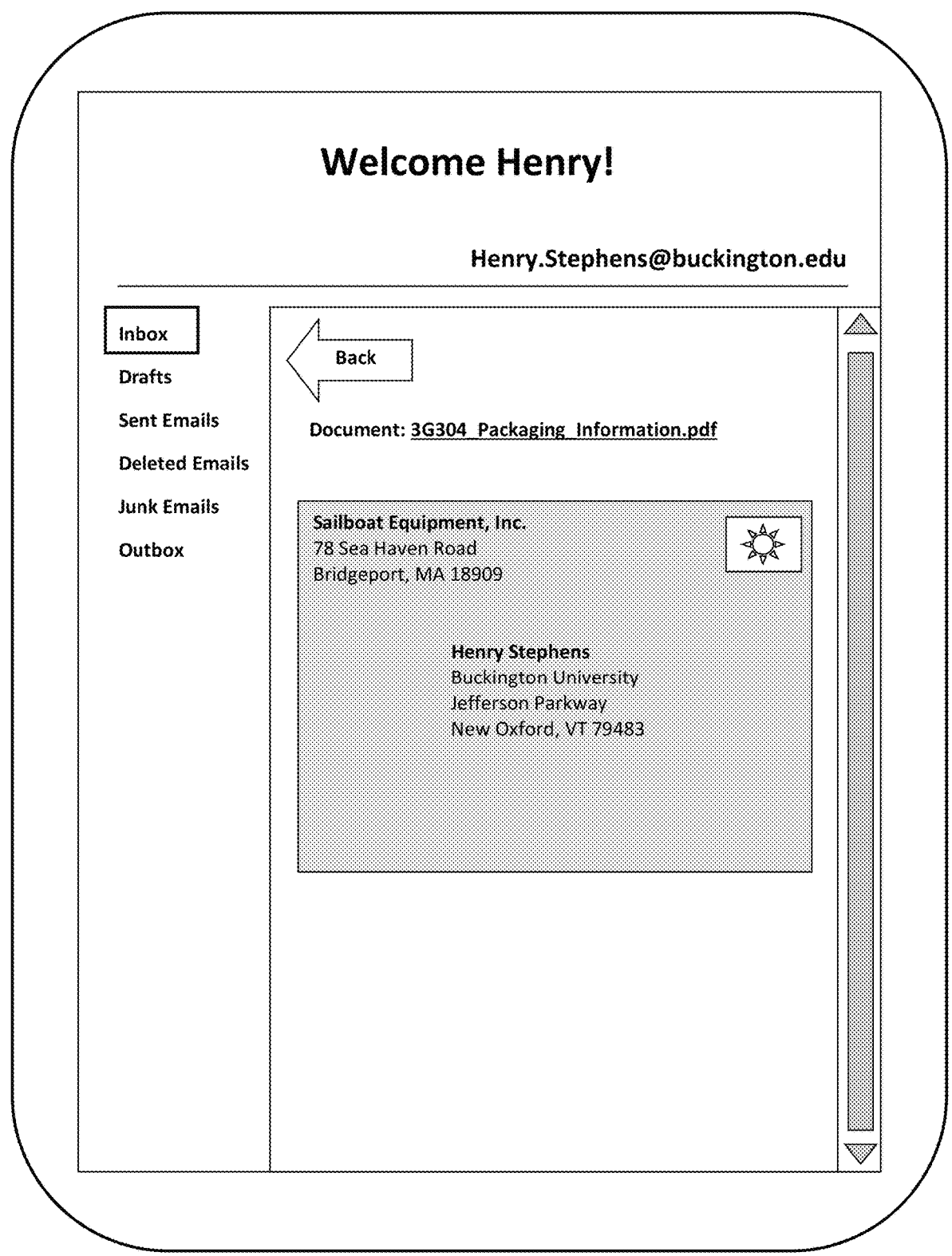

In an example embodiment, the notification may also include a digital image corresponding to the mail item attached as a document (e.g., pdf, GIF, png, etc.) that can be viewed, such as shown in FIG. 10C. Such image shows who sent the mail item, and consequently the mail service customer may have a better determination of what kind of action is to be taken (e.g., destroy package, receive package, forward package to another address, etc.).

Figure 10D:
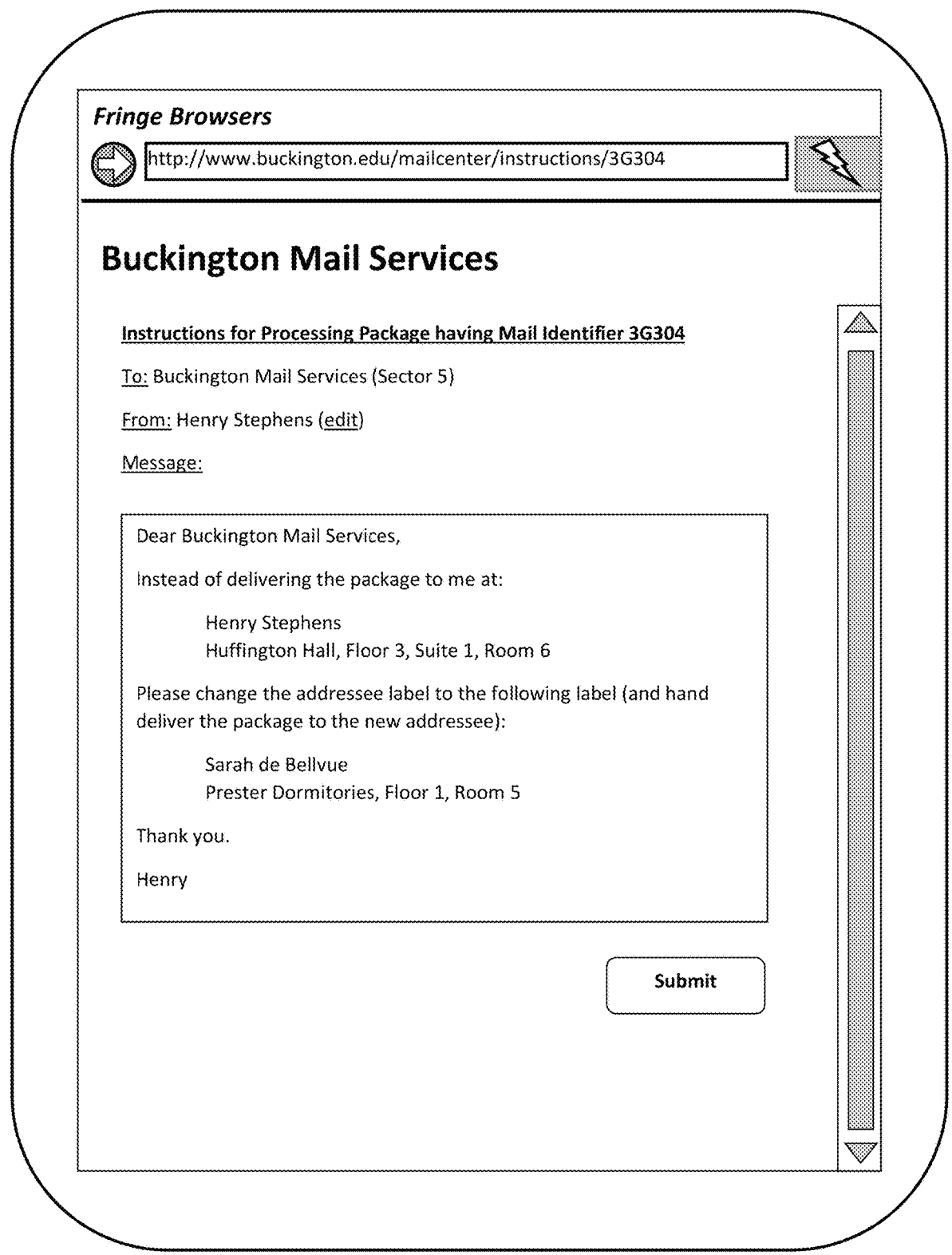

Thus, the terminal may receive instructions from the customer to activate the link in the notification (S906) which causes the terminal to present a predetermined webpage to the customer (S907). In an example embodiment, the predetermined webpage may be automatically generated every time a mail item is received at the mailcenter. Further, such predetermined webpage may include ways for the customer to input his or her instructions. For example, the instruction can include a message to forward the package to a classmate (Sarah de Bellvue), such as shown in FIG. 10D.

Figure 10E:
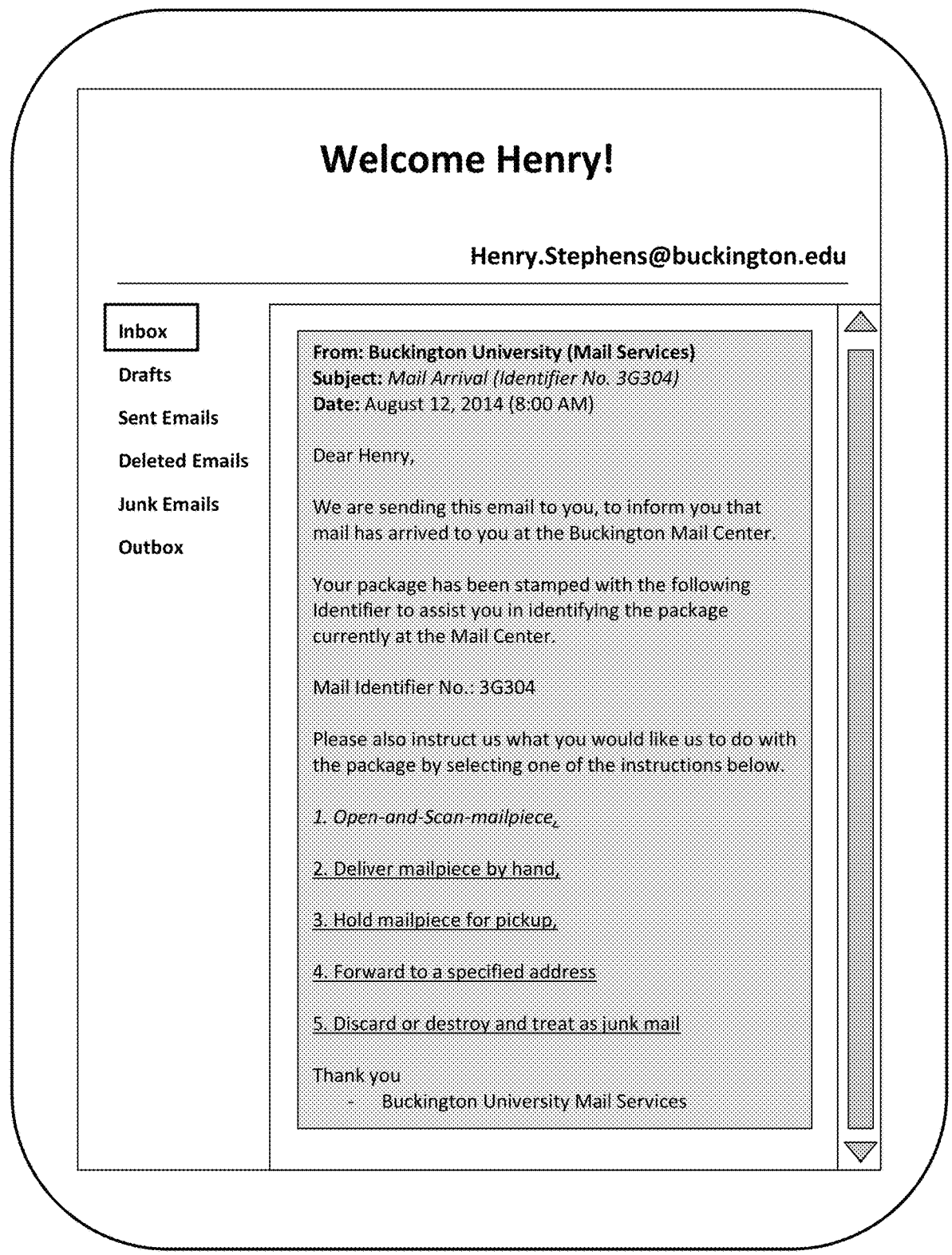

On the other hand, in the case that the notification includes predetermined responsive instructions (S902, yes), the terminal may receive a selection of one of the predetermined responsive instructions (S903). For example, there may be a variety of predetermined responsive instructions (e.g., open-and-scan-mailpiece, deliver mailpiece by hand, hold mailpiece for pickup, forward to a specified address, discard or destroy and treat as junk mail, etc.), such as shown in FIG. 10E. In an example embodiment, the customer may not have the option of selecting all of the predetermined responsive instructions. In other words, a special circumstance may prevent selection of one of the options. For example, in this case, the package may not contain any documents at all. Instead, the package may only include some purchased items that are not suitable for scanning Thus, the "open-and-scan-mailpiece" option may not be available. As such, to indicate that this option is not available, the option is unselectable and may include characteristics (e.g., italicized, different font, etc.) to point this out.

Figure 10F:
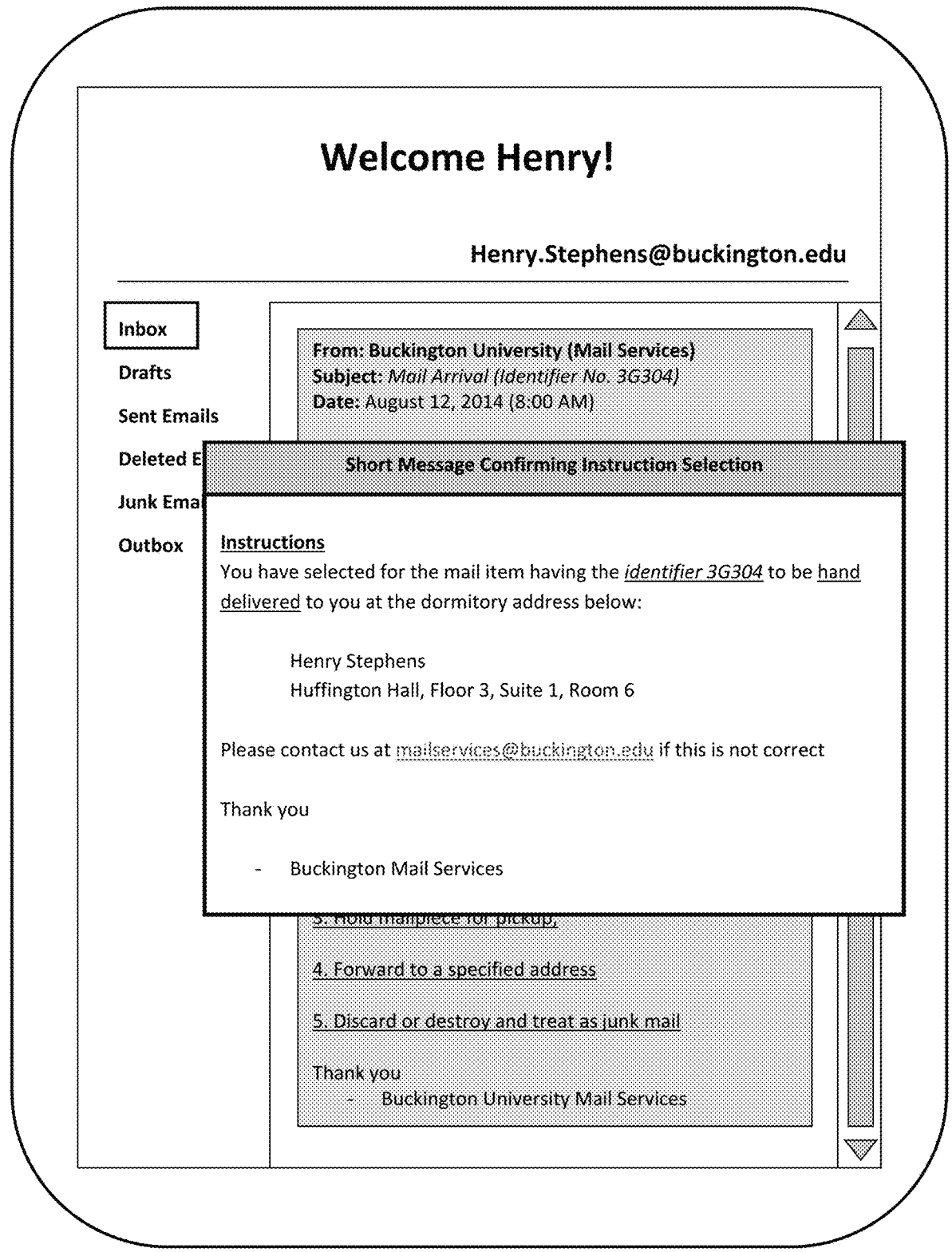
Figure 10G:
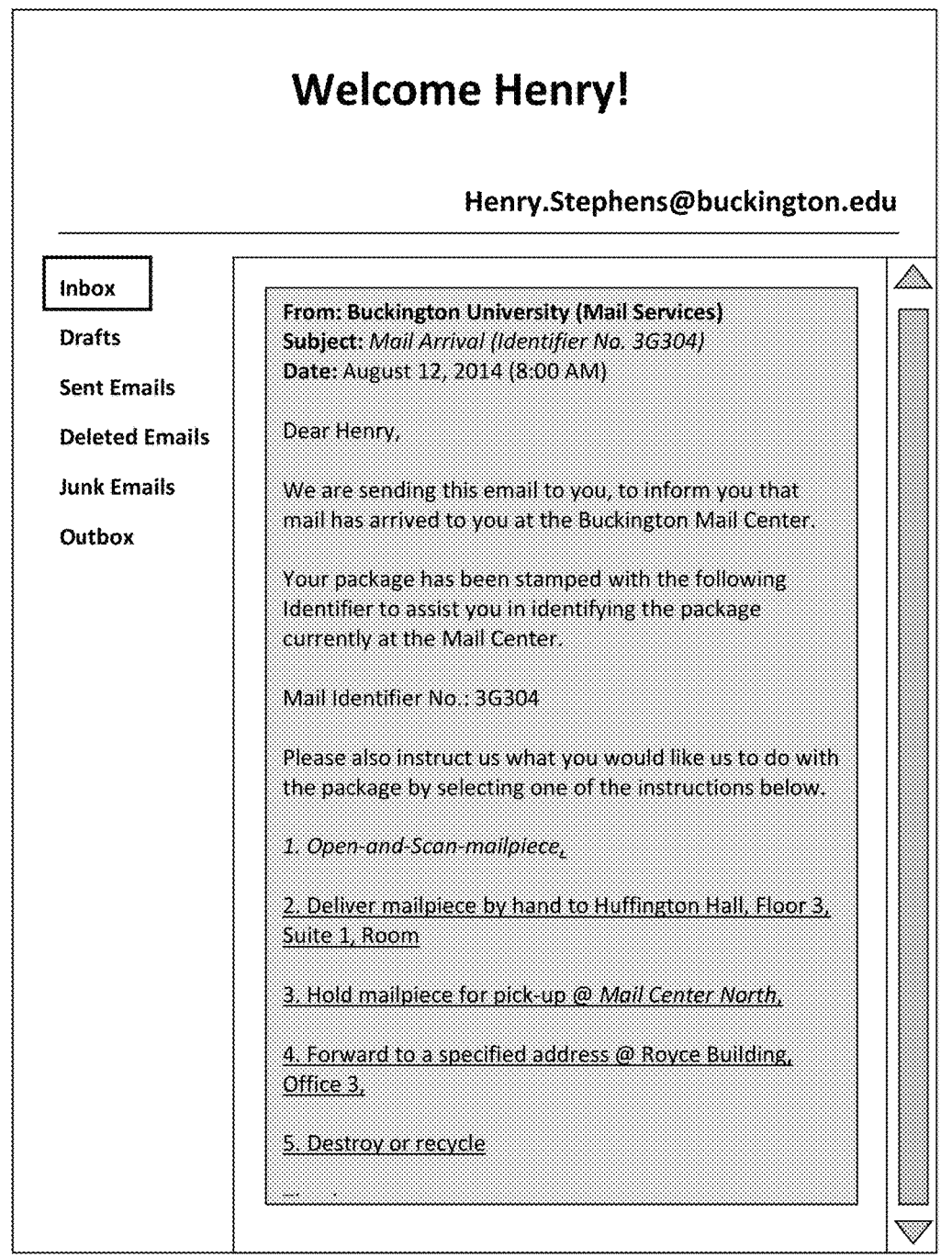

The customer may simply select the predetermined responsive instructions by activating the corresponding link (e.g., open-and-scan-mailpiece, deliver mailpiece by hand, hold mailpiece for pickup, forward to a specified address, discard or destroy and treat as junk mail, etc.). For example, the mail service customer may select the predetermined responsive instruction to hand the mailpiece to dormitory staff instead. After selecting the corresponding predetermined responsive instruction for hand-delivery, a message may automatically be presented to the customer confirming the selection of the predetermined responsive instruction as well as other relevant information, such as shown in FIG. 10F. After receiving the selected predetermined response, the terminal sends the selected predetermined response to the mailcenter for processing (S904). FIG. 10G is another example embodiment of a notification with another set of predetermined optional instructions.

Figure 11:
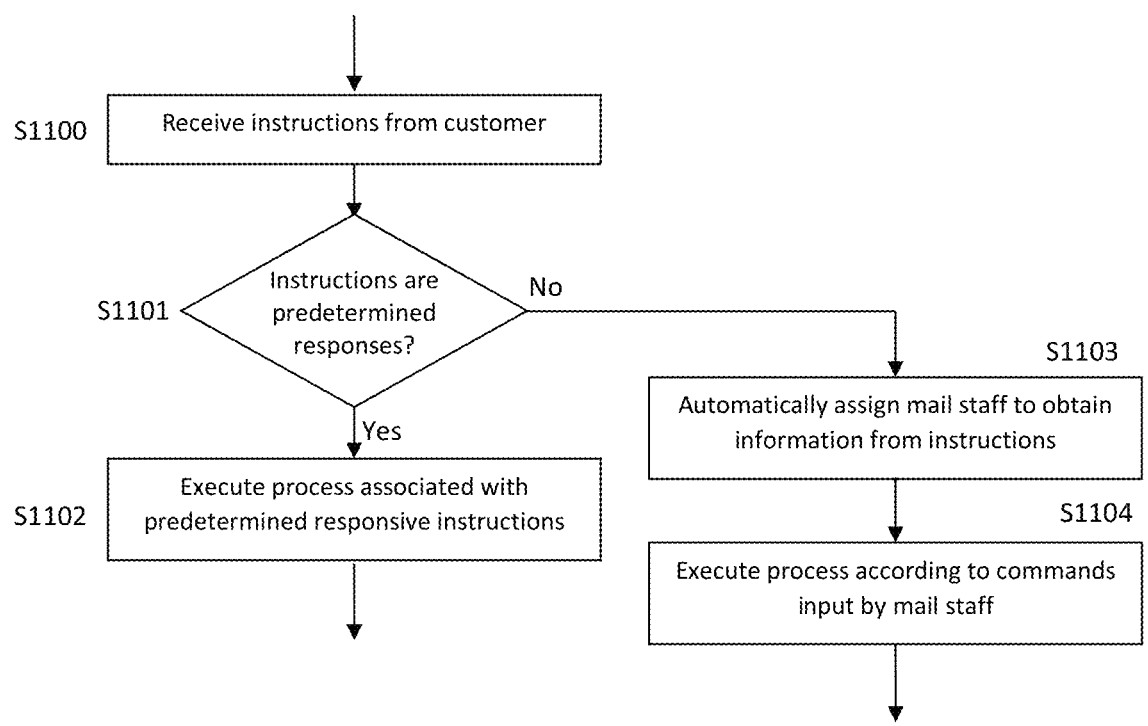
FIG. 11 shows a flow chart for a method that can be performed in any of the systems of FIGS. 1A-1C (or an equivalent)

FIG. 11 shows a method that can be performed by a mail processing controller (e.g., 101d in FIGS. 1A-1C) of the scanner workstation (e.g., 101 in FIGS. 1A-1C) according to an example embodiment.

After receiving instructions from the customer via a webpage or predetermined responsive instructions (S1100), the mail processing controller determines how the instructions were sent. In other words, the mail processing controller determines whether the instructions were manually written (or typed) by a customer or were generated from the predetermined responsive instructions. In the case that the instructions are not predetermined responsive instructions (S1101, no), the mail processing controller automatically assigns mailcenter staff to obtain information from the instructions sent by the customer (S1103). In this case, for example, the instructions sent by the customer may have been manually typed in a format that is only understood by people (and not machines). Thus, the mailcenter staff may read the instructions sent by the customer and input the instructions as corresponding commands that can be understood by the mail processing controller. After receiving such commands, the mail processing controller executes a process corresponding to the commands (S1104). On the other hand, in the case that the instructions are predetermined responsive instructions (S1101, yes), the mail processing controller executes a process associated with the predetermined responsive instructions (S1102).

Figure 12:
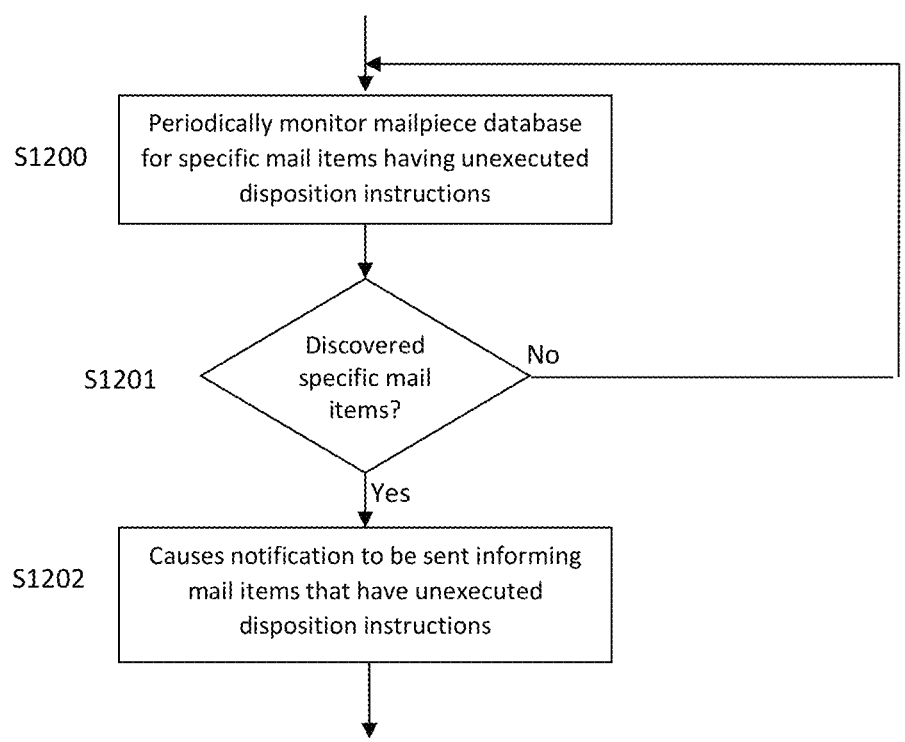
FIG. 12 shows a flow chart for a method that can be performed in any of the systems of FIGS. 1A-1C (or an equivalent)

FIG. 12 shows a method that can be performed by a mail processing controller (e.g., 101d in FIGS. 1A-1C) of the scanner workstation (e.g., 101 in FIGS. 1A-1C) according to an example embodiment.

In certain cases there may be large amounts of incoming mail into the mailcenter. As a result, it may be difficult for the mailcenter to handle such large amount of mail. It may be possible that instructions sent from the intended addressees on processing the associated mail item may not be executed. To prevent such issues from occurring, the mail processing controller periodically monitors a mailpiece database (e.g., 105 in FIG. 1B) to determine if any specific mail items have corresponding instructions that have not yet been executed (S1201). In the case that the mail processing controller discovers one or more specific mail items that have unexecuted disposition instructions (S1201, yes), the mail processing controller causes a notification to be sent informing mail items that have unexecuted disposition instructions (S1202). For example, the notification may in the form of an alert (or email, SMS message, etc.) that is sent to a terminal (e.g., tablet, smartphone, computer, etc.) of the respective mailcenter staff who is responsible for the mail item. Otherwise, in the case that there is no one or more specific mail items that have unexecuted disposition instructions (S1201, no), the mail processing controller continues to perform periodic monitoring.

Figure 13:
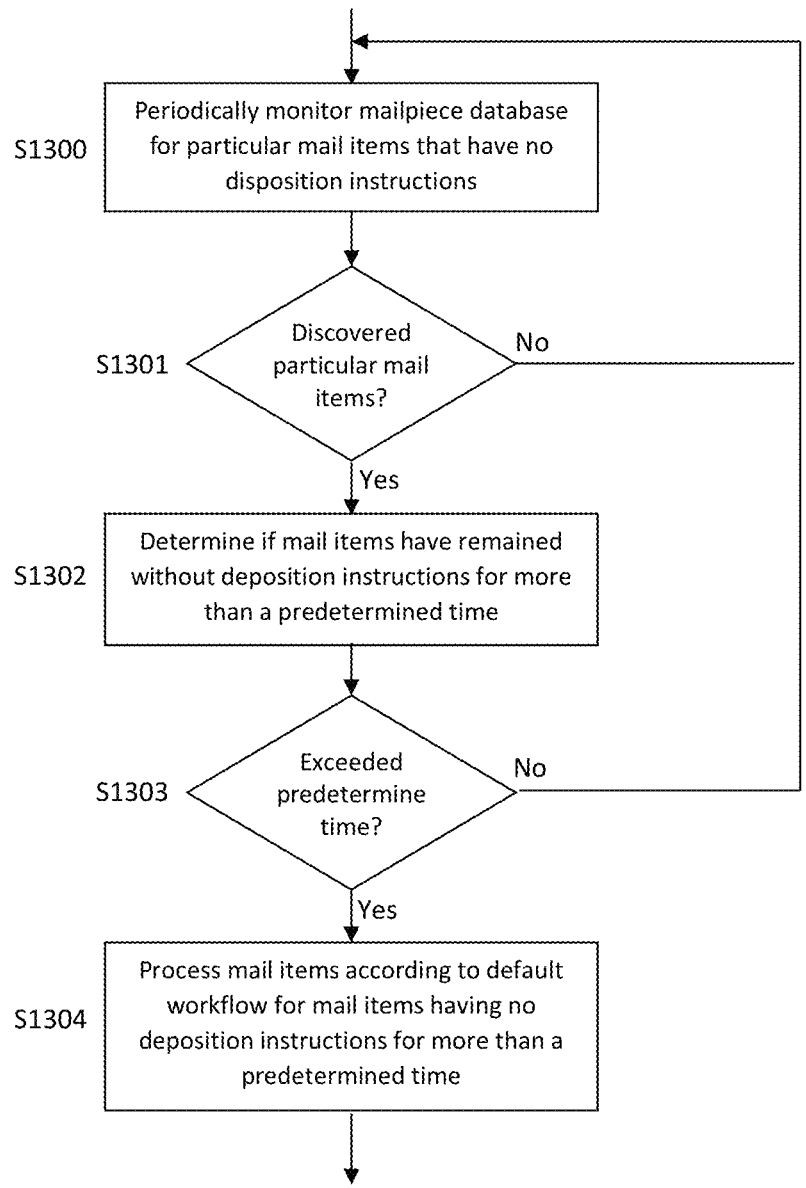
FIG. 13 shows a flow chart for a method that can be performed in any of the systems of FIGS. 1A-1C (or an equivalent)

FIG. 13 shows a method that can be performed by a mail processing controller (e.g., 101d in FIGS. 1A-1C) of the scanner workstation (e.g., 101 in FIGS. 1A-1C) according to an example embodiment.

Not every customer has the time or the concern to send instructions on processing one or more mail items intended for the customer. Further, not every customer remembers that he or she needs to send instructions. Thus, it is possible that within the mailcenter, there may be one or more mail items that have no processing instructions.

Accordingly, the mail processing controller can periodically monitor the mailpiece database for particular mail items that have no disposition instructions (S1300). In the case that all the particular mail items have disposition instructions (S1301, no), the mail processing controller goes back to monitoring. Otherwise (S1301, yes), in the case that one or more of the particular mail items have no disposition instructions, the mail processing controller determines if the particular mail items have remained without deposition instructions for more than a predetermined time (S1302).

The predetermined amount of time (e.g., minutes, hours, days, weeks, months, years, etc.) may be preset by authorized mailcenter staff. In one example embodiment, each particular mail item may have a different predetermined time set by the mail processing controller. This may be determined by the sender information or the size of the package. For example, in the case that the sender is determined to be from an important government agency (e.g., Internal Revenue Service), the predetermined time may be set longer (e.g., month). On the other hand, in the case that the sender is determined to be from a retailer (e.g., Walmart), the predetermined time may be shorter (e.g., a week).

In the case that, for each mail item that has no disposition instructions, the predetermined time for at least one mail that has no disposition instructions has not been exceeded (S1303, no), the mail processing controller goes back to monitoring. On the other hand, in the case that, for each mail item that has no disposition instructions, the predetermined time for at least one mail that has no disposition instructions has been exceeded (S1303, yes), the mail processing controller processes the mail items according to default workflow (S1204). The default workflow is set by the mailcenter. In other words, the default workflow is an action or series of action that are to be taken with regard to a mail item that has no disposition instructions for more than a predetermined period of time. For example such actions may include destroying the mail item, moving the mail item to a warehouse, hand delivering the mail item to the intended addressee, a combination of the aforementioned actions, etc. By having this default workflow, it is possible to eliminate any space issues within the mailcenter.

Figure 14:
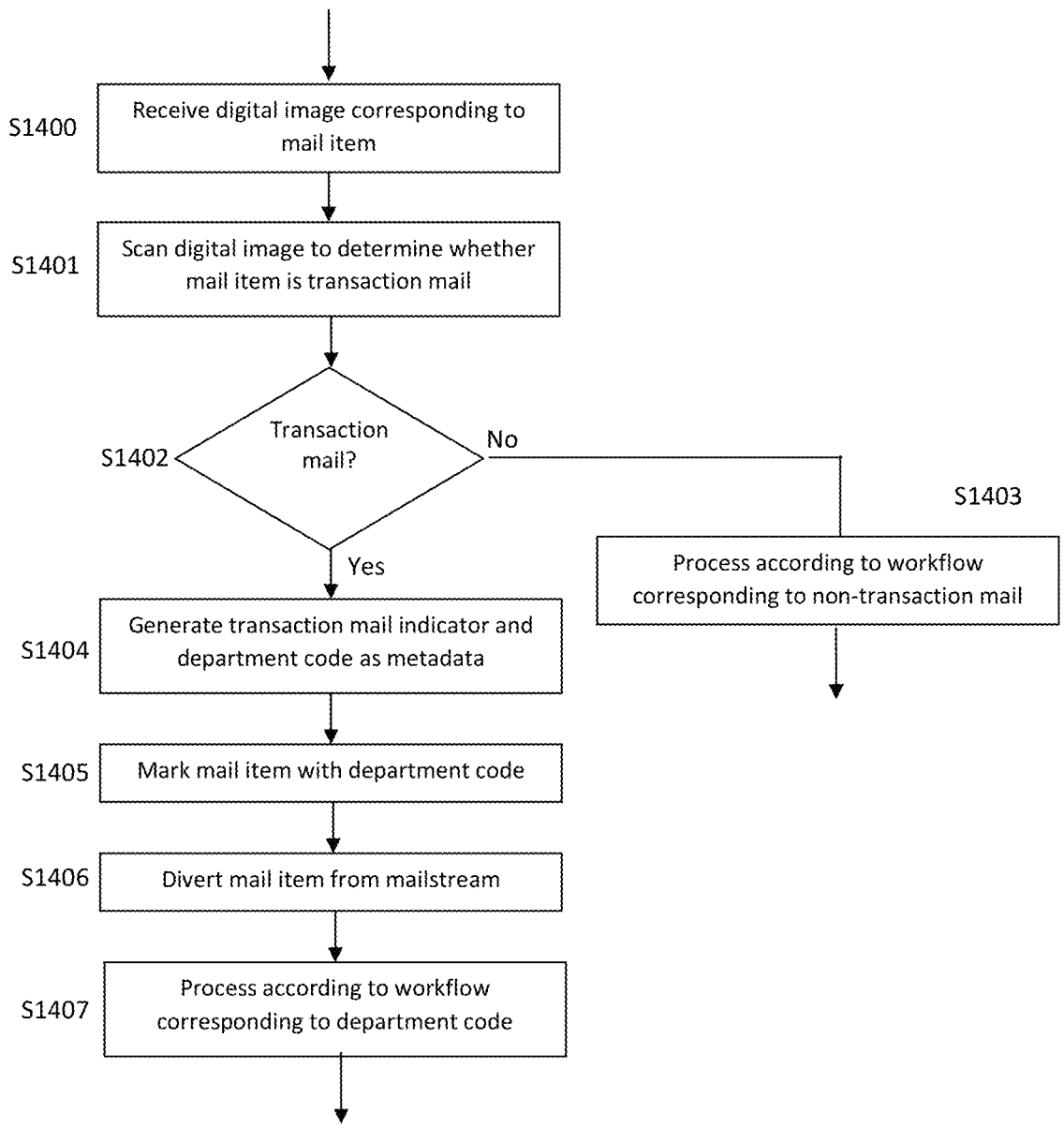
FIG. 14 shows a flow chart for a method that can be performed in any of the systems of FIGS. 1A-1C (or an equivalent)

FIG. 14 shows a method that can be performed by a scanner workstation (e.g., 101 in FIGS. 1A-1C) according to an example embodiment.

Figure 15A:
FIG. 15A-15B show examples of pieces of mail.

After the image processing apparatus of the scanner workstation receives a digital image corresponding to a mail item (S1400), the image processing device scans the digital image to determine whether such mail item is transaction mail (S1401). Transaction mail may be any type of mail that includes Accounts Payable, Accounts Receivable, Claims, Human Resources, Remittance, etc. There may be a number of different ways by which the image processing apparatus determines whether the mail item is transaction mail or not. For example, the image processing apparatus may determine from a logo on the mail item (e.g., IB for International Bank) or a barcode (signifying that this is transaction mail) placed by the sender, that such mail item is transaction mail, such as shown in FIG. 15A.

Figure 15B:

In the case that the image processing apparatus determines that the mail item is not transaction mail (S1402, no), the mail item is processed according to a workflow corresponding to mail items that are not transaction mail (S1403). On the other hand, in the case that the image processing apparatus determines that the mail item is transactional mail (S1402, yes), the image processing apparatus generates a transaction mail indicator (to indicate that the mail item is transaction mail) and a department code (to indicate which department in the mailcenter is to be processed at and how the mail item is to be processed at such department) as metadata (S1404). Next, the imprinter prints the department code physically on the casing of the mail item (S1405), such as shown in FIG. 15B. Next, the mail processing controller causes the diverter to divert the mail item from the mailstream (S1406). Next, processing is performed on the mail item according to a predetermined workflow corresponding to the department code (S1407).

Figure 16:
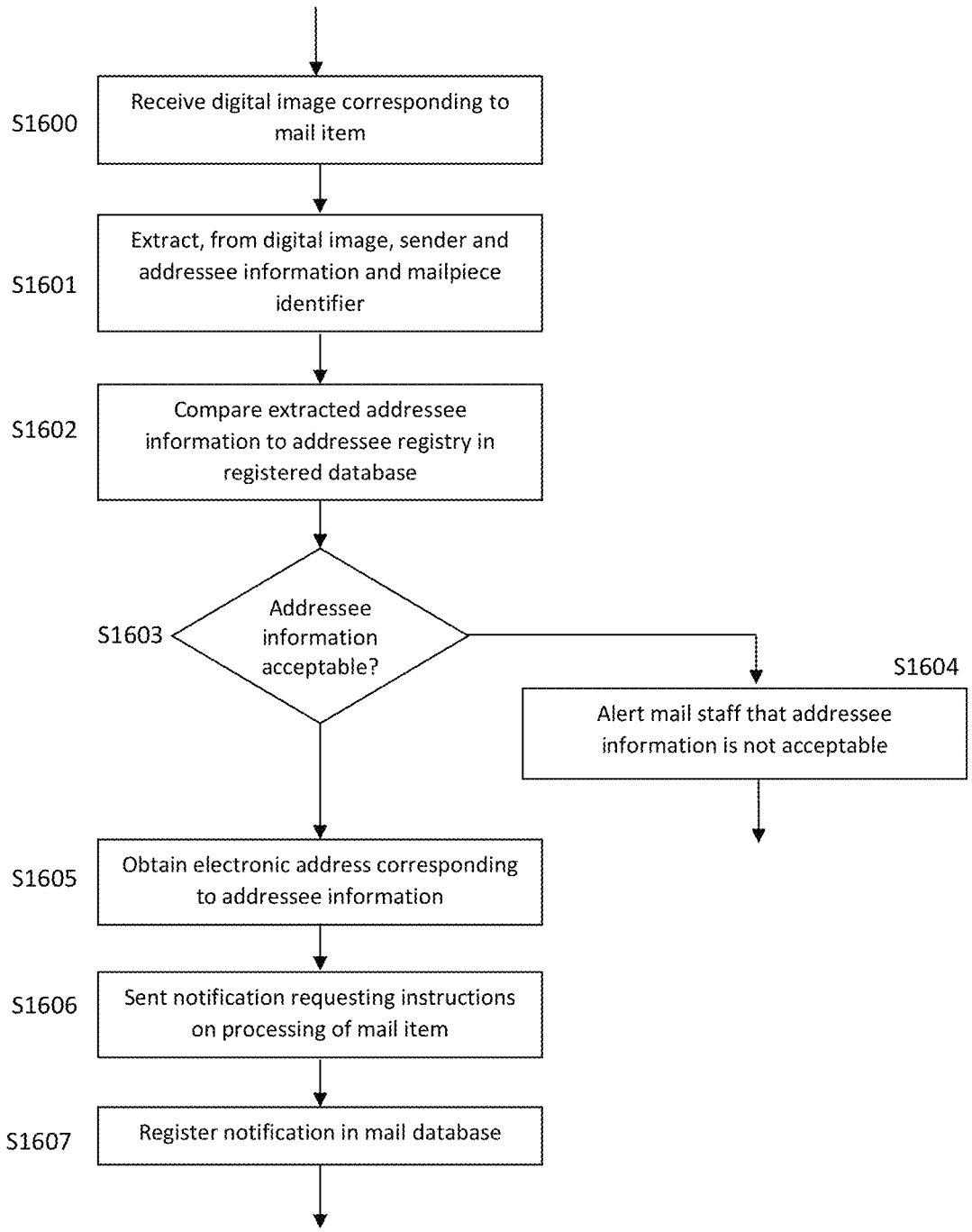
FIG. 16 shows a flow chart for a method that can be performed in any of the systems of FIGS. 1A-1C (or an equivalent)

FIG. 16 shows a method that can be performed by a scanner workstation (e.g., 101 in FIGS. 1A-1C), according to an example embodiment.

When a mail processing controller determines receives a digital image corresponding to a mail item (S1600), the mail processing controller performs analysis on the digital image by extracting information from the digital image (S1601). For example, the mail processing controller may perform character recognition (e.g., OCR) upon the digital image to recognize characters (e.g., letters, symbols, numbers, etc.) present in the digital image. After obtaining such characters, the mail processing controller may determine the sender and addressee information (e.g., names, department, title, physical address, etc.).

Once the mail processing controller determines the addressee information, the mail processing controller compares the addressee information to a recipient registry in a registered database to determine whether the addressee information is acceptable (S1602). The recipient registry may include names and corresponding addresses of one or more customers. For example, the addressee information may be illegible (or impossible to extract from the digital image). Thus, such addressee information cannot be compared to data registered in the recipient registry. In another example, the physical address corresponding to the addressee information may be legible (and therefore extractable). However, the person corresponding to the addressee information may no longer be at that physical address. Thus, such addressee information may not be acceptable. In yet another example, the mail item may be undeliverable as addressed (UAA). In other words, the mail item may have sender information indicating that a person sent the mail item from mail facility. However, since the mail item could not be delivered, it was returned to the mail facility.

In the case that the mail processing controller determines that the addressee information is unacceptable (i.e. not acceptable) (S1603, no), the mail processing controller alerts a mail staff to this issue by sending him or her a message (e.g., via email, SMS message, etc.) (S1604). It may be that the mail staff knows which action to perform. For example, the addressee information on the mail item may be unreadable by a computer, but recognizable by a person. Thus, the mail staff may simply perform the portions of processing that the mail processing controller cannot (e.g., manually input addressee information into the records, etc.). In another example, the mail staff may discuss with other mail staff to determine which action to take in the case that he or she does not know why the mail processing controller rejected the addressee information.

On the other hand, in the case that the addressee information is acceptable (S1603, yes), the mail processing controller determines the electronic address (e.g., email) of the customer associated with the addressee information (S1605). Next, the mail processing controller sends a notification to the electronic address that (i) mail item has been received at the mail facility and (ii) request for instructions on processing the mail item (S1606). Afterwards, the mail processing controller registers the notification sent to the customer in a mail database (S1607). By registering the notification, a records is kept so that when issues (e.g., notification lost, notification never sent out, notification deleted by customer accidentally, etc.) occur, the notification can be retrieved for analysis or for resending.

Figure 17:
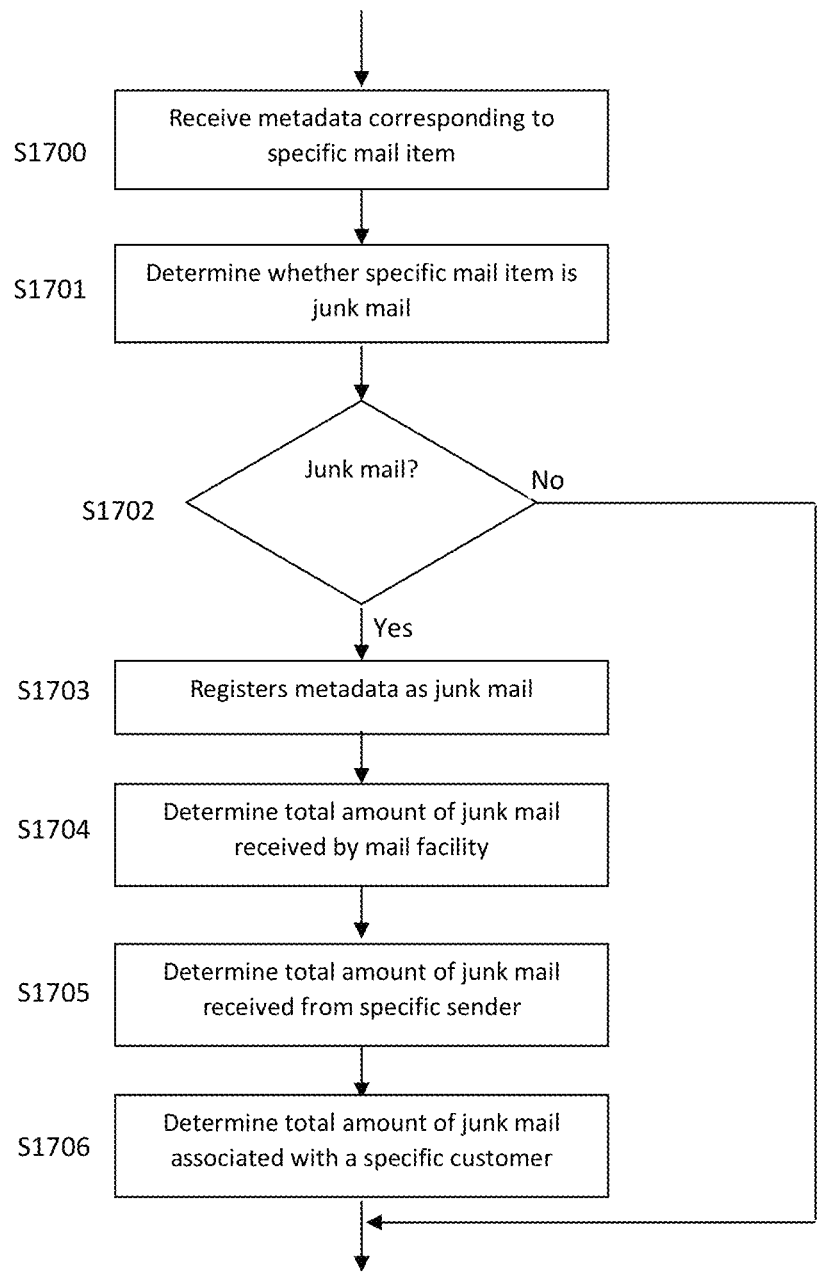
FIG. 17 shows a flow chart for a method that can be performed in any of the systems of FIGS. 1A-1C (or an equivalent).

FIG. 17 shows a method that can be performed by a scanner workstation (e.g., 101 in FIGS. 1A-1C) according to an example embodiment.

When the mail processing controller receives receive metadata corresponding to specific mail item (S1700), the mail processing controller determines whether the specific mail item is junk mail using the metadata (S1701). For example, the metadata may include words and phrases (on the packaging of the mail item) that may indicate that the mail item is junk mail. In the case that the mail item is junk mail (S1702, yes), the mail processing controller registers in the metadata that the mail item is junk mail (S1703). Next, the mail processing controller determines (i) the total amount of junk mail received by mail facility (S1704), (ii) the total amount of junk mail received from a specific sender (S1705) and (iii) the total amount of junk mail associated with a specific customer (S1706). Otherwise, in the case that the mail item is not junk mail (S1702, no), the process ends.

Please note that while the aforementioned examples relate to a mailcenter within a school, the application is not limited to such scenario. For example, the mailcenter may be for a corporate or organizational campus. In another example, the mailcenter may be a post office, such as servicing a rural (or other relatively small population) community in which mail delivery may or may not be a burden. The aforementioned system may be adapted to render the process more efficient and convenient and allow the customers to select if they want a specific mailpiece or not.

In another example, a two pass process may be applied to process postcards, letters and flats through the intelligent delivery system on arrival at the mailcenter. In the first pass, a barcode camera or scanner captures barcode data (e.g., IMB—intelligent mail barcode) from the mail piece, and an imprinter imprints a unique mailpiece identifier on the mailpiece. In the second pass, a digital camera captures one or more images of the mailpiece and an OCR provision scans the digital image(s) of the mailpiece to extract printed data from the exterior of the envelope or packaging, and associates it with the IMB data that was collected on the first pass, by using the imprinted barcode to link the datasets.

In such system, incoming mail may be scanned into batches of numbered mail trays (or bins) and shelved to await disposition instructions by the addressees. In a transactional workflow, a department code is imprinted on the transactional mail piece on the second pass and diverted from the rest of the mailstream, and then it can be sorted by department code and entered into a predefined transactional workflow.

On the other hand, for correspondence mail, the system notifies the mail service customer via email that a mailpiece has been received for the customer and provides a link to a webpage where the addressee can view the image of the outside of the mailpiece as well as data regarding the mailpiece and make a disposition decision regarding the mailpiece which has been received by the mailcenter for the customer.

The system can be configured to track the decision made regarding the mailpiece based on the image of the envelope or package presented to the customer. Periodically, the system may notify the mailcenter staff regarding which trays of mail have mailpieces within them that have had dispositions decisions made. Such staff may optionally pull the designated trays from the shelves and process the entire tray of mail back through a system scanner. Mailpieces within the tray for which a disposition decision has been received is imprinted with a disposition code (such as open/scan, hold, deliver, destroy, etc.) and diverted from the rest of the mailstream to be processed according to the code on the mailpiece. Mailpieces for which no disposition decision have been received are processed through the scanner and returned into the numbered tray to be placed back on the shelf for future processing.

If the customer has elected to have their mailpiece opened and scanned, the system may process the mailpiece through a high volume opener/extractor/scanner, or mailcenter staff may process through a manual opening and scanning process. In either instance, a notification is transmitted via email to indicate to the customer that the contents of the mailpiece are available for viewing, and a link is provided in the notification to view the mailpiece and contents.

The aforementioned specific embodiments are illustrative, and many variations can be introduced on these embodiments without departing from the spirit of the disclosure or from the scope of the appended claims. For example, elements and/or features of different examples and illustrative embodiments may be combined with each other and/or substituted for each other within the scope of this disclosure and appended claims. For example, the orders in which the steps are performed in the aforementioned methods are not limited to those shown in the examples of FIGS. 5A-5D, 7-9 and 11-14, and may be switched as long as similar results are achieved. Also, it should be noted that the methods illustrated in the examples of FIGS. 5A-5D, 7-9 and 11-14 may be implemented using any of the systems described in connection with FIGS. 1A-1C.

What is claimed is:

1. An intelligent delivery system for a community including a mailcenter, comprising:
   a customer database registering contact information for plural registered mail customers;
   a mail notification apparatus that, upon command, transmits a notification of arrived mail to an electronic address of a specified customer amongst the plural mail customers registered in the customer database;
   a mailpiece database to register data for arrived mail; and
   one or more scanner workstations, each scanner workstation including:
      a mail processing controller to control mail processing flow;
      one or more image capture devices to capture and output a digital image of an address-bearing face of a piece of mail;
      an imprinter to print a mailpiece identifier uniquely assigned to the piece of mail, for use on the piece of mail; and
      an image processing apparatus that, upon receiving the digital image of the address-bearing face, determines whether the piece of mail corresponds to transactional mail based on at least one of a logo included the digital image, a barcode placed by a sender of the piece of mail included the digital image, or addressee information indicating an addressee of the piece of mail extracted from the digital image
      wherein when the image processing apparatus determines the piece of mail is transactional mail, the mail processing controller causes the imprinter to print at least one of a transaction indicator or a department code assigned to a corresponding transaction, and causes the piece of mail to be processed according to a predetermined workflow,
      wherein when the image processing apparatus determines the piece of mail is not transaction mail, the mail processing controller determines the electronic address of the specified customer by using the addressee information to query the customer database, and causes the mail notification apparatus to transmit the notification bearing the mailpiece identifier uniquely assigned to the piece of mail and the digital image as an attachment to the notification, to the electronic address of the specified customer, to notify arrival of the piece of mail at the mailcenter.

2. The intelligent delivery system as claimed in claim 1, wherein the notification transmitted to the electronic address of the specified customer includes a selectable link to a predetermined page specified by a uniform resource locator, to specify instructions to the mailcenter, for processing the piece of mail.

3. The intelligent delivery system as claimed in claim 1, wherein the scanner workstation further includes:
   a mail opener device to open a mailpiece upon command, wherein when the specified instruction is open-and-scan-mailpiece, the mail processing controller, upon the piece of mail being retrieved and routed to the mail opener device, causes the mail opener device to open the piece of mail, causes the image capture devices to capture and output digital images of sheets in the piece of mail, and cause the digital images of the sheets in the piece of mail to be transmitted electronically to the electronic address of the specified customer.

4. The intelligent delivery system as claimed in claim 1, wherein the notification transmitted to the electronic address of the specified customer includes selectable links to activate respective predetermined responsive instructions to the mailcenter, for processing the piece of mail.

5. The intelligent delivery system as claimed in claim 4, wherein the selectable predetermined responsive instructions, for which links are provided in the notification, include open-and-scan-mailpiece, deliver mailpiece by hand, hold mailpiece for pickup, forward to a specified address, discard or destroy and treat as junk mail.

6. The intelligent delivery system as claimed in claim 4, wherein the selectable predetermined responsive instructions, for which links are provided in the notification, include (i) open the piece of mail, scan contents thereof into one or more digital images and transmit electronically the digital images to the electronic address of the mail service customer, (ii) destroy or recycle the piece of mail, (iii) hold the piece of mail for pickup at a specified pickup location by the mail service customer, (iv) deliver by hand to a predetermined address, and (v) deliver by hand to a specified address.

7. The intelligent delivery system as claimed in claim 1, wherein the mail processing controller causes the mail notification apparatus to insert the mailpiece identifier in the notification transmitted to the electronic address of the specified customer, to identify the arrived piece of mail.

8. The intelligent delivery system as claimed in claim 1, wherein the image processing apparatus, upon receiving the digital image of the piece of mail, scans the digital image to determine whether the digital image includes an embedded mailpiece identifier, and when the digital image includes the embedded mailpiece identifier, the image processing apparatus extracts the embedded mailpiece identifier and outputs the extracted mailpiece identifier to the mail processing controller, and
wherein the mail processing controller checks whether a mail processing instruction is registered in connection with the mailpiece identifier of the piece of mail, in the mailpiece database, and when the mail processing instruction is registered in the mailpiece database in connection with the mailpiece identifier of the piece of mail, the mail processing controller causes the imprinter to print the mail processing instruction, on the piece of mail.

9. The intelligent delivery system as claimed in claim 1, wherein when the image processing apparatus determines that the digital image corresponds to transactional mail, the image processing apparatus outputs the digital image and the metadata including the transaction mail indicator and the department code, to the mail processing controller, and wherein when the mail processing controller receives the metadata including the mailpiece identifier, the transaction mail indicator and the department code, the mail processing controller causes the imprinter to print the department code on the piece of mail and causes the piece of mail to be processed according to a predetermined workflow corresponding to the department code.

10. The intelligent delivery system as claimed in claim 1, wherein the scanner workstation further includes:
a transport base to transport mail along a mailstream; and
a diverter to divert a selected mailpiece from the mailstream,
wherein when the mail processing controller receives the metadata including the transaction mail indicator and the department code, the mail processing controller causes the diverter to divert the piece of mail from the mailstream, for processing according to the predetermined workflow corresponding to the department code.

11. The intelligent delivery system as claimed in claim 1, wherein when the piece of mail is deposited in a temporary storage bin, the bin identifier is registered in association with the mailpiece identifier of the piece of mail, in the mailpiece database.

12. The intelligent delivery system as claimed in claim 1, wherein the mail processing controller periodically checks the mailpiece database for mailpieces having unexecuted disposition instructions registered in connection therewith in the mailpiece database, and when the mail processing controller determines there are mailpieces having unexecuted disposition instructions registered in connection therewith in the mailpiece database, the mail processing controller causes a notification of the mailpieces and unexecuted disposition instructions to be transmitted electronically to the mailcenter.

13. The intelligent delivery system as claimed in claim 1, wherein the mail processing controller periodically checks the mailpiece database for mailpieces having no disposition instructions and having been received at least a predetermined number of days ago, and for each mailpiece amongst the mailpieces having no disposition instructions and having been received at least a predetermined number of days ago, causes the mailpiece to be processed according to a default workflow for mail with no disposition instruction.

14. The intelligent delivery system as claimed in claim 1, wherein the mail processing controller, upon receiving the metadata and the corresponding digital image, uses the addressee information to query the customer database, and when the query yields matches to plural records in the customer database, the mail processing controller compares the remainder of the metadata to the plural records to select a record amongst the plural records that corresponds to a best match to the metadata.

15. The intelligent system as claimed in claim 1, wherein the mail processing controller determines, upon receiving the metadata and the corresponding digital image, whether the piece of mail is returned mail or UAA (undeliverable as addressed) mail which was sent by a mail service customer of the mailcenter and returned by a postal service to sender.

16. The intelligent system as claimed in claim 1, wherein the mail processing controller determines, upon receiving the metadata and the corresponding digital image, whether the piece of mail is junk mail, and if the mail processing controller determines that the piece of mail is junk mail, registers the metadata for the piece of mail in the mailpiece database as junk mail.

17. The intelligent delivery system as claimed in claim 1, wherein the image processing apparatus, upon receiving the digital image of the address-bearing face, performs optical character recognition to extract from the digital image (i) sender information indicating the sender of the piece of mail and (ii) the addressee information indicating the addressee of the piece of mail.

18. The intelligent delivery system as claimed in claim 1, wherein the image processing apparatus extracts an intelligent mail barcode from the digital image and decodes the intelligent mail barcode to determine the sender information and the addressee information in connection with the piece of mail.

19. The intelligent delivery system as claimed in claim 1, wherein the metadata output by the image processing apparatus includes date and time that the digital image was captured.

20. The intelligent delivery system as claimed in claim 1, wherein the pre-determined amount of time varies based on the sender of the piece of mail.

21. The intelligent delivery system as claimed in claim 1, wherein the pre-determined amount of time varies based on a size of the piece of mail.

22. The intelligent delivery system as claimed in claim 1, wherein the default workflow comprises destroying the piece of mail.

23. The intelligent delivery system as claimed in claim 1, wherein the default workflow comprises moving the piece of mail to a warehouse.

24. The intelligent delivery system as claimed in claim 1, wherein the default workflow comprises hand delivering the piece of mail to the addressee.

* * * * *